(12) United States Patent
Carroll et al.

(10) Patent No.: US 8,558,524 B2
(45) Date of Patent: Oct. 15, 2013

(54) MASTER/SLAVE POWER SUPPLY SWITCH DRIVER CIRCUITRY

(75) Inventors: Robert T. Carroll, Andover, MA (US); Ronald B. Hulfachor, Nashua, NH (US)

(73) Assignee: International Rectifier Corporation, El Segundo, CA (US)

( * ) Notice: Subject to any disclaimer, the term of this patent is extended or adjusted under 35 U.S.C. 154(b) by 429 days.

(21) Appl. No.: 13/069,208

(22) Filed: Mar. 22, 2011

(65) Prior Publication Data

US 2012/0091977 A1 Apr. 19, 2012

Related U.S. Application Data

(60) Provisional application No. 61/394,687, filed on Oct. 19, 2010.

(51) Int. Cl.
G05F 1/59 (2006.01)

(52) U.S. Cl.
USPC ............................................ 323/272; 363/72

(58) Field of Classification Search
USPC ....................................... 323/272; 363/65, 72
See application file for complete search history.

(56) References Cited

U.S. PATENT DOCUMENTS 6,819,577 B1 * 11/2004 Wiktor et al. .................... 363/72
7,777,462 B2 * 8/2010 Kudo et al. .................... 323/272
2004/0208029 A1 * 10/2004 Caruthers et al. ................ 363/72
2006/0209579 A1 * 9/2006 Duerbaum et al. .............. 363/65
2006/0238179 A1 * 10/2006 Harris et al. .................... 323/272
2006/0244570 A1 * 11/2006 Leung et al. ............. 340/310.11
2008/0272752 A1 * 11/2008 Qiu et al. ........................ 323/272
2008/0303495 A1 * 12/2008 Wei et al. ....................... 323/272
2008/0310200 A1 * 12/2008 Maksimovic et al. ........... 363/65
2009/0237133 A1 * 9/2009 Yang .............................. 327/161
2010/0097828 A1 * 4/2010 Chen ................................ 363/72
2010/0109622 A1 * 5/2010 Miki et al. ...................... 323/272
2012/0091977 A1 * 4/2012 Carroll et al. .................. 323/271
2012/0262136 A1 * 10/2012 Nien et al. ..................... 323/272

* cited by examiner

*Primary Examiner* — Jeffrey Sterrett
(74) *Attorney, Agent, or Firm* — Chapin IP Law, LLC

(57) ABSTRACT

A power supply circuit can be configured to include a first circuit and a second circuit. Each circuit can be substantially identical to each other but provide different functionality depending on how they are configured. For example, each of the first circuit and second circuit can be chips having substantially the same pin layout and internal circuitry. However, the functionality provided by the circuits varies depending on whether a respective circuit is configured as a master or slave. The first circuit is configured as the master and generates multiple phase control signals. The first circuit uses a portion of the multiple phase control signals to control a first set of phases. The first circuit transmits a second portion of the multiple phase control signals to the second circuit configured as a slave. The second circuit is configured to receive and use the second portion of control signals to control a second set of phases.

31 Claims, 15 Drawing Sheets

MASTER/SLAVE POWER SUPPLY SWITCH DRIVER CIRCUITRY

RELATED APPLICATIONS

This application is related to and claims the benefit of earlier filed U.S. Provisional Patent Application Ser. No. 61/394,687 entitled "Master-Slave Phase Quadrupling Circuit and Method," filed on Oct. 19, 2010, the entire teachings of which are incorporated herein by this reference.

BACKGROUND

In general, overclocking involves running a computer processor at a higher clock rate than it was designed to handle in order to increase its performance. Overclocking typically causes a respective processor to consume very high current compared to consumption when the processor operates within a range of lower acceptable frequencies as specified by a vendor.

High current consumption caused by overclocking may require that a respective power supply powering the processor include a sufficiently high number of power converter phases to deliver power to the processor. Otherwise, the computer processor will not be able to operate at such high frequencies.

To provide extra power, a power supply can be modified to include many power converter phases. However, although possible, it is often impractical and difficult to build power supply controllers with many extra phases due to chip package pin limitations, die complexity, die cost limitations, etc.

Where practical, conventional power supplies including many power converter phases typically implement so-called phase multiplying techniques to expand a number of phases in a power supply. Via so-called phase multiplying, one PWM signal can be divided to produce n (where n is an integer value) PWM signals. The PWM signals can then be used to control multiple phases.

As shown in FIG. 1, one conventional implementation of phase multiplying requires a combination of a single phase doubling driver 110 to be used in series with two additional dual phase driver circuits 120-1 and 120-2 to achieve phase quadrupling.

For example, in such a conventional application as in FIG. 1, the phase doubling driver 110 produces a first phase signal (zero degree signal) and second phase signal (180 degree phase signal) based on a received pulse width modulation signal, PWM1. The phase doubling driver 110 outputs the first phase signal 115-1 to a first dual phase driver circuit 120-1 in the series. The phase doubling driver 110 outputs the second phase signal 115-2 to a second dual phase driver circuit 120-2.

Each of the first dual phase driver circuit 120-1 and second dual phase driver circuit 120-2 can further divide the respective received phase signal from the phase doubling driver into two signals to control a respective pair of phases in the power supply. More specifically, the first dual diver circuit 120-1 splits the first phase signal 115-1 and drives the 0-degree phase (e.g., Phase #1) and 90-degree phase (e.g., Phase #2) of the power supply. The second dual diver circuit 120-2 splits the second phase signal 115-2 and drives the 180-degree phase (e.g., Phase #3) and 270-degree phase (e.g., Phase #4) of the power supply. Thus, according to one conventional application, a single pulse width modulation signal PWM1 inputted to the phase doubling driver 110 can be used to control four power converter phases in a power supply.

BRIEF DESCRIPTION

Conventional applications such as those as discussed above can suffer from a number of deficiencies. For example, as discussed above, conventional power supply systems can implement phase doubling techniques to increase a number of phases to provide power to a load. However, such implementations typically require relatively large (e.g., an excess number of chips) and complex driver circuits and complex routing of traces to implement phase doubling, quadrupling, etc. Additionally, the conventional method of implementing a sequence of circuits as discussed above introduces a large amount of undesirable circuit delay, potentially affecting an overall performance of the power supply.

Embodiments herein deviate with respect to conventional implementations. For example, embodiments herein include unique ways of expanding a power supply to include and control operation of additional power converter phases.

More specifically, according to one embodiment herein, each of a first switch driver chip circuit device and second switch driver chip circuit device can be a semiconductor chip installed in a power supply circuit. The chips or circuit devices can be substantially identical to each other but provide different functionality depending on how they are configured. For example, according to one embodiment, each of the first circuit device and second circuit device can have the same pin layout and internal circuitry interconnected to each other via one or more links such as traces of a circuit board. Directional transmission of control information on the links depends on whether a device is a master or slave. In one embodiment, a master driver circuit transmits control information to a slave driver circuit. However, note that the functionality provided by the circuit devices or chips varies depending on whether a respective circuit is configured as a master or slave.

In accordance with another embodiment, a power supply includes a first chip and a second chip. The first chip in the power supply can be configured (via first mode setting information) to be a master phase control driver circuit; the second chip can be configured (via second mode setting information) to be a slave phase control driver circuit of the power supply.

During operation, the first circuit or master driver circuit receives a phase control signal such as a pulse width modulation signal from a controller. Via a phase generator circuit in the first circuit device configured as a master, the first circuit device converts the received pulse width modulation control signal into a set of multiple phase control signals. Thus, in one embodiment, the first circuit produces the pulse width modulation control signals based on the received pulse width modulation signal.

Each of the multiple phase control signals generated by the phase generator circuit in the master can be offset in phase from each other such as by a multiple such as 90 degrees. The first circuit configured as a master uses a first portion of the set of multiple phase control signals to control a first set of power converter phases of the power supply.

Because the first circuit is configured to be the master, the first circuit configures a set of configurable bi-directional ports or pins of the first circuit to be output pins (as opposed to input pins). The first circuit uses the output pins to output a second portion of the set of multiple phases to the second circuit. Because the second circuit is configured as a slave, instead of generating phase control signals in a respective phase generator circuit in the slave driver circuit, the second circuit configures respective bi-directional ports of the second circuit to be inputs to receive the second portion of multiple phases outputted by the first circuit. The second circuit uses the received phase signals from the first circuit to control a second set of phases in the power supply.

Accordingly, via configuring a first circuit as a master and a second circuit as a slave, a single pulse width modulation signal received by the first circuit can be converted into multiple phase control signals. Each of the first circuit and second circuit use a portion of the multiple phases generated by the phase generator in the first circuit to control respective power converter phases in the power supply.

In one embodiment, the multiple phase control signals (as derived from a pulse width modulation signal by the phase generator in the first circuit) are spaced apart from each other by an amount such as 90 degrees. By way of a non-limiting example, the phase generator can generate a first phase control signal (zero degrees), a second phase control signal (90 degrees), a third phase control signal (180 degrees), and a fourth phase control signal (270 degrees). As previously discussed, generation of four phase control signals is shown by way of non-limiting example only.

In accordance with yet further embodiments, the first circuit can be configured to utilize the first phase control signal (zero degrees) to generate switch control signals to control a pair of switch circuits (e.g., high side switch circuit and low side switch circuit) in a first power converter phase of the power supply. The first circuit also uses the third phase control signal (180 degrees) to control a pair of switch circuits (e.g., high side switch circuit and low side switch circuit) in a second power converter phase of the power supply.

The second circuit receives the second phase control signal (90 degrees) and the fourth phase control signal (270 degrees) generated by the phase generator circuit in the first circuit. The second circuit uses second phase control signal (90 degrees) to control a pair of switches (e.g., high side switch circuit and low side switch circuit) in a third power converter phase of the power supply. The second circuit uses the fourth phase control signal (270 degrees) to control a pair of switches (e.g., high side switch circuit and low side switch circuit) in a fourth power converter phase of the power supply. Each pair of switches of a phase can include a respective synchronous switch circuit and a control switch circuit.

Embodiments herein can be used in any suitable application such as the field of multiphase DC-DC power delivery. In such embodiments, the master/slave circuit configuration affords a flexible, and relatively compact and cost effective circuit for controlling multiple phases in a DC-DC power converter to deliver power in high-performance applications in which a load such as a processor consumes substantial power. For example, via configuration of master/slave circuitry in a power supply, a single pulse width modulation signal can be parsed, phase doubled, quadrupled, etc., to expand a number of phases in a power supply that are controlled to provide power to a load.

These and other more specific embodiments are disclosed in more detail below.

It is to be understood that the systems, methods, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by CHiL Semiconductor of Tewksbury, Mass., USA.

As discussed herein, techniques herein are well suited for use in applications such as switching power supplies, voltage regulators, low voltage processors, buck converters, boost regulators, buck-boost regulators, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A power supply circuit can be configured to include at least a first switch driver circuit and a second switch driver circuit.

Each switch driver circuit can be substantially identical to each other but provide different functionality depending on how they are configured. For example, each of the first switch driver circuit and second switch driver circuit can be chips having substantially the same pin layout and internal circuitry. However, the functionality activated in each chip can vary depending on whether a respective circuit is configured as a master or slave.

In one embodiment, a first circuit is configured as the master and generates multiple phase control signals from a received pulse width modulation signal. The first circuit uses a portion of the multiple phase control signals to control a first set of phases. The first circuit transmits a second portion of the multiple phase control signals to a second circuit configured as a slave. The second circuit uses the second portion of control signals to control a second set of phases. Accordingly, the first circuit (e.g., master circuit) uses a first portion of locally generated control signals to control a first set of power converter phases. A second circuit (e.g., the slave circuit) receives and utilizes the second portion of control signals to control a second set of power converter phases.

Figure 1:
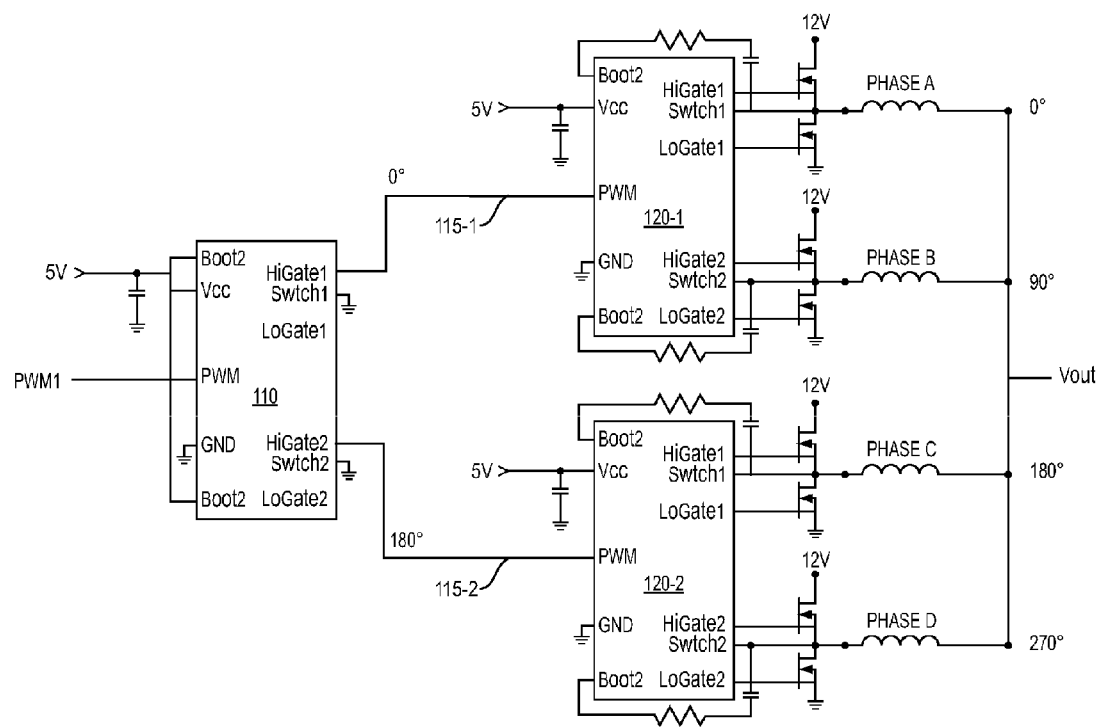
FIG. 1 is an example diagram of a conventional way of expanding phases in a power supply.
Figure 2:
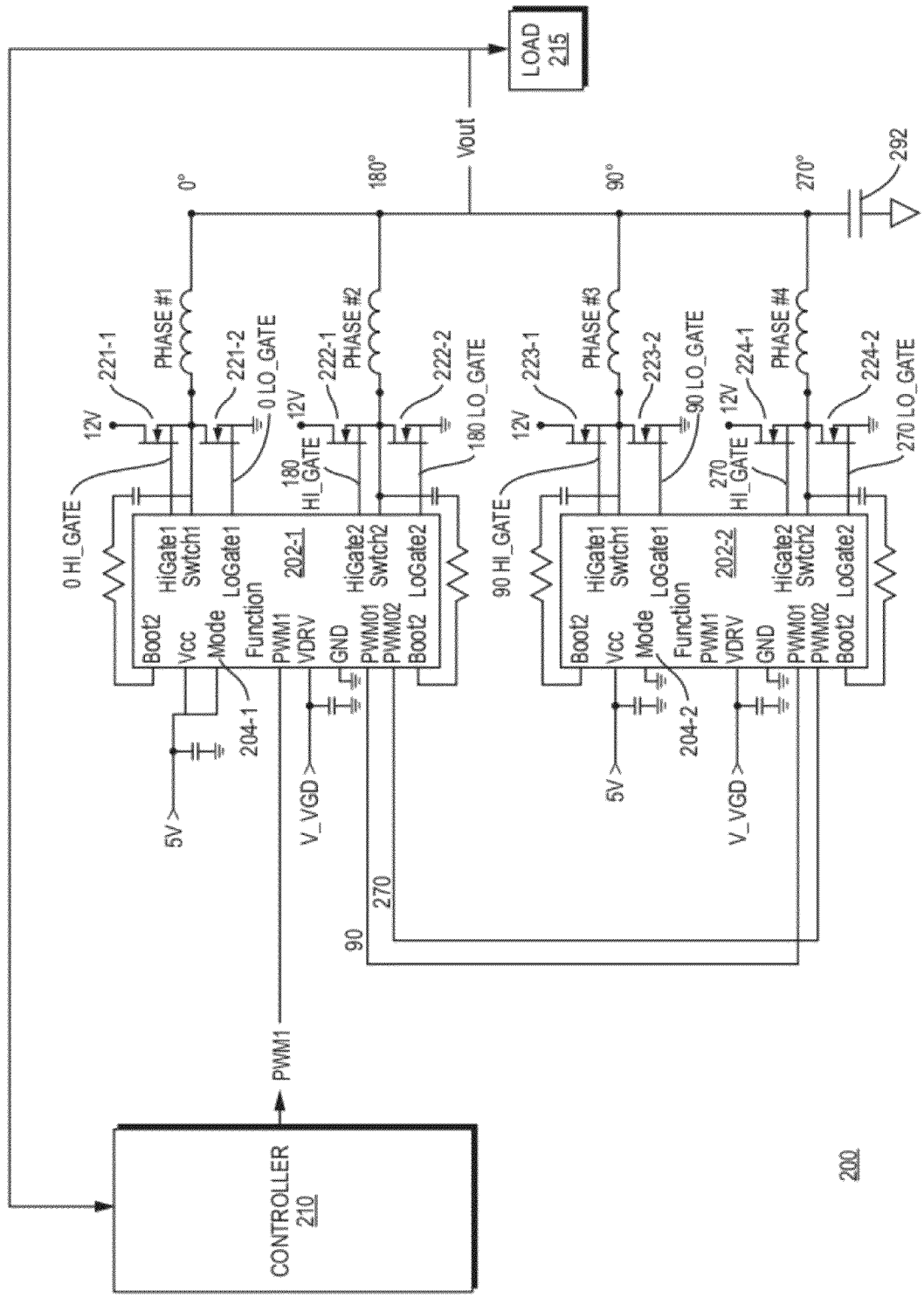
FIG. 2 is an example diagram illustrating a controller and switch driver circuitry in a power supply according to embodiments herein.

FIG. 2 is an example diagram of a power supply and control circuit according to embodiments herein.

As shown, power supply circuit 200 includes a controller 210 and corresponding master driver circuit 202-1 and slave driver circuit 202-2. By way of a non-limiting example, each of the master driver circuit 202-1 and slave driver circuit 202-2 can be a packaged semiconductor chip. In such an embodiment, the chips include identical pin nomenclatures and internal circuitry, but are configured differently as a master or slave depending on mode input. For example, as shown, the mode pin 204-1 is pulled up to a logic high or 5 volts to set the master driver circuit 202-1 as a master. The mode pin 204-2 is pulled down to a logic low or ground to configure the slave driver circuit 202-1 as a slave.

Accordingly, in one embodiment, a first chip circuit such as master driver circuit 202-1 monitors and detects a state of at least one mode pin, function pin, etc., of the first circuit. The state of the at least one mode pin of the first circuit indicates that the first circuit device is configured to be the master driver circuit 202-1. A second circuit detects a state of at least one mode pin, function pin, etc., of the second circuit. The state of the at least one mode pin of the second circuit indicates that the second circuit is configured to be the slave driver circuit 202-2.

Note that configuring the driver circuits via external pull-up or pull-down circuitry is shown by way of non-limiting example only and that devices can be configured in any suitable manner such as via switch commands inputted to each circuit, setting of registers in the circuits, etc.

As shown, output pins such as HiGate1 and LoGate1 of master driver circuit 202-1 are electrically connected to respective gates of switches 221-1 and 221-2 in phase #1. Output signal HiGate1 of master driver circuit 202-1 controls a state switch 221-1. Output signal LoGate1 of master driver circuit 202-1 controls a state of switch 221-2. Output pins such as HiGate2 and LoGate2 of master driver circuit 202-1 are electrically connected to gates of respective switches 222-1 and 222-2 in phase #2. Output signal HiGate2 of master driver circuit 202-1 controls a state switch 222-1. Output signal LoGate2 of master driver circuit 202-1 controls a state of switch 222-2.

Output pins such as HiGate1 and LoGate1 of slave driver circuit 202-2 are electrically connected to respective gate of switches 223-1 and 223-2 in phase #3. Output signal HiGate1 of slave driver circuit 202-2 controls a state switch 223-1. Output signal LoGate1 of slave driver circuit 202-2 controls a state of switch 223-2. Output pins such as HiGate2 and LoGate2 of master driver circuit 202-2 are electrically connected to respective gates of switches 224-1 and 224-2 in phase #4. Output signal HiGate2 of slave driver circuit 202-2 controls a state switch 224-1. Output signal LoGate1 of slave driver circuit 202-2 controls a state of switch 224-2.

Thus, in one embodiment, the signal PWM1 produced by controller 210 is a control signal for controlling states of pairs of switches in each phase. As will be discussed later in this specification, a duration of activating high side switch circuitry and low side switch circuitry can be substantially the same for each of multiple phases.

In one embodiment, rather than activating all of the power converter phases at the same time, activation of phases can be spaced apart from each other by substantially 90 degrees or other offset amount so that the phases are activated at different times to reduce a respective ripple voltage on the output voltage. Thus, a combination of the master driver circuit 202-1 and slave driver circuit 202-2 enables phase expansion (e.g., one pulse width modulation signal drives multiple phases) to increase current delivered to a load as well as a phase spacing function (e.g., each phase in a respective bank is activated at different times during the switching cycle) to reduce a ripple voltage.

In one embodiment, the master driver circuit 202-1 utilizes the pulse width modulation signal PWM1 to generate a 0 DEG signal (e.g., first phase signal), 90 DEG signal (e.g., the second phase signal), 180 DEG signal (e.g., the third phase signal), and 270 DEG signal (e.g., the fourth phase signal). In such an embodiment, the first phase signal, second phase signal, third phase signal, and the fourth phase signal are out of phase with each other by a multiple of substantially 90 degrees.

Thus, based on phase expansion supported by the master driver circuit 202-1 and slave driver circuit 202-2, the input signal PWM1 can be used to drive a bank of four phases (namely, phase #1, phase #2, phase #3, and phase #4) instead of only a single phase.

In addition to outputting signal PWM1, note that the controller 210 can be configured to output additional pulse width modulation signals such as PWM2, PWM3, etc. The power supply circuit 200 can be configured to include additional pairs of master/slave circuits such as that discussed for master driver circuit 202-1 and slave driver circuit 202-2. In accordance with embodiments herein, PWM1 can be used to drive a first pair of master/slave circuits as previously discussed, PWM2 can be used to drive a second pair of master/slave circuits, PWM3 can be used to drive a third pair of master/slave circuits etc. Accordingly, the controller 210 can produce eight individual pulse width modulation signals (e.g., PWM1, PWM2, ..., PWM8) to drive eight respective banks of power converter phases (e.g., each bank includes 4 phases) to power the load 215.

Note that the master and slave driver circuits 202 can be configured to drive any suitable number of power converter phases and that four has been shown by way of a non-limiting example. Also, the controller 210 can be configured to produce any suitable number of pulse width modulation signals. Thus, the power supply circuit 200 can vary depending on a number of power converter phases that will be controlled to provide power to the load 215.

During operation, controller 210 monitors parameters associated with generation of the output voltage, $V_{OUT}$, applied to load 215. The controller 210 maintains the output voltage in regulation by adjusting the duty cycle associated with pulses in the PWM1 control signal. For example, in general, to increase an amount of current supplied to load 215, the controller 210 increases an amount of time in a switch control cycle that respective high side switches (e.g., one or more of switches 221-1, 222-1, 223-1, and 224-1) are activated or turned to an ON state. To decrease an amount of current supplied to the load 215, the respective low side switches can be activated or turned to an ON state for relatively longer durations.

Figure 3:
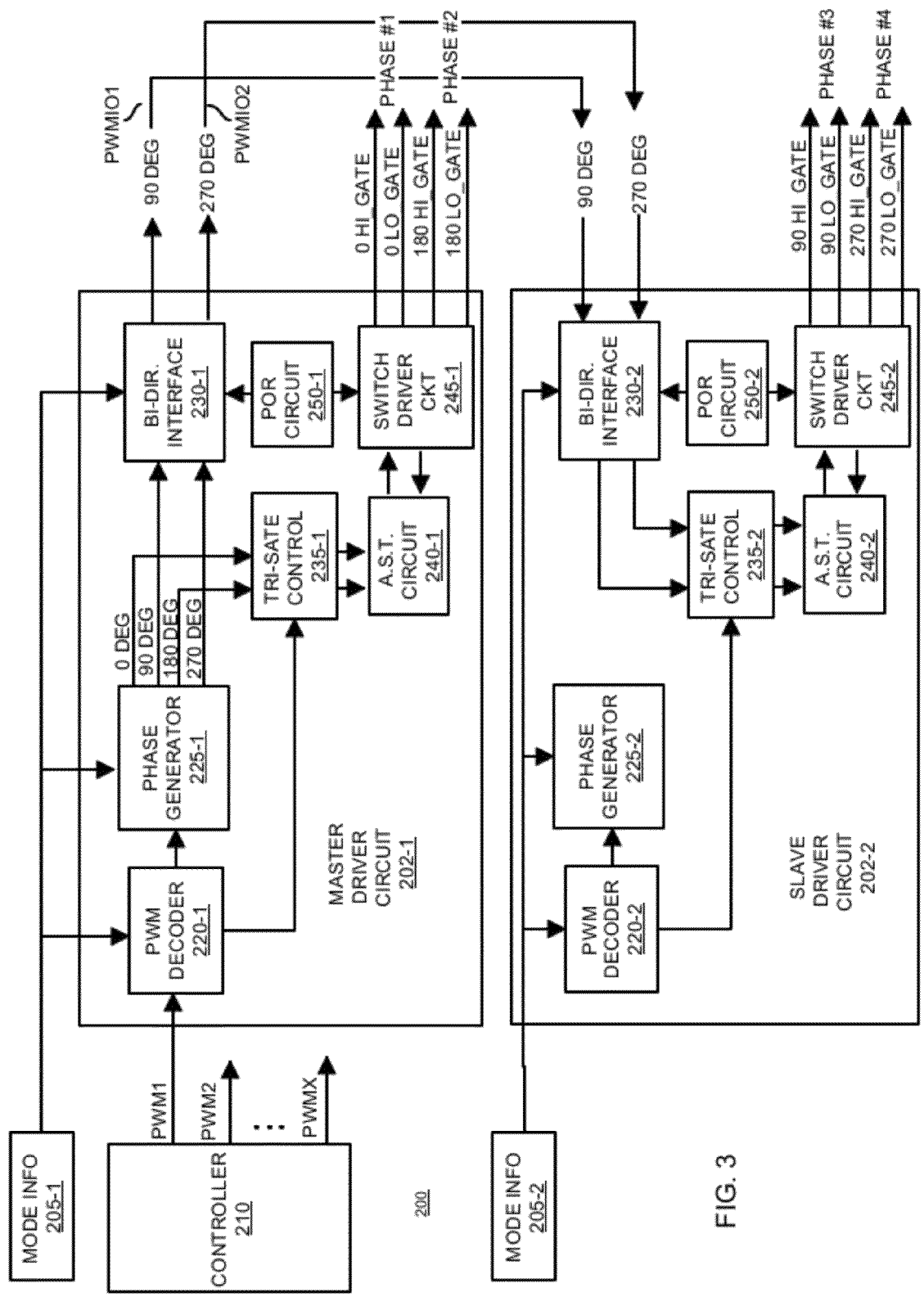
FIG. 3 is an example diagram of master/slave switch driver circuitry according to embodiments herein.

FIG. 3 is an example diagram illustrating more detailed functionality provided by a master/slave configuration according to embodiments herein.

As shown in FIG. 3, master driver circuit 202-1 includes: PWM decoder circuit 220-1, phase generator circuit 225-1, bi-directional interface circuit 230-1, tri-state control circuit 235-1, anti-shoot through circuit 240-1, POR circuit 250-1, and switch driver circuit 245-1.

Slave driver circuit 202-2 includes: PWM decoder circuit 220-2, phase generator circuit 225-2, bi-directional interface circuit 230-2, tri-state control circuit 235-2, anti-shoot through circuit 240-2, POR circuit 250-2, and switch driver circuit 245-2.

In general, and as previously discussed, each of master driver circuit 202-1 and slave driver circuit 202-2 can be a semiconductor chip having the same or substantially the same internal circuitry and pin layout. However, the master driver circuit 202-1 receives input of respective mode information 205-1 indicating to configure it as a master chip or master circuit. The slave driver circuit 202-2 receives input of respective mode information 205-2 indicating to configure it as a slave chip or slave circuit.

In one embodiment, the PWM1 signal is a tristate signal. For example, a first state such as a high level of the PWM1 signal indicates to set both the control switch and synchronous switch in a respective phase to an OFF state. A second state such as a medium level of the PWM1 signal indicates to set the control switch to activate the control switch and deactivate the synchronous switch in a respective phase. A third state such as a low level of the PWM1 signal indicates to set the control switch to deactivate the control switch and activate the synchronous switch in a respective phase.

The PWM decoder circuit 220-1 in the master driver circuit 202-1 decodes the received pulse width modulation signal PWM1 based on the three possible levels (high, medium, and low states). The PWM decoder circuit 220-1 outputs decoded states of the PWM1 signal to the tri-state control circuit 225-1.

In one embodiment, based on the decoded pulse width modulation signal produced by the PWM decoder circuit 220-1, the phase generator circuit 225-1 converts or splits the decoded pulse width modulation signal into four phase control signals (0 degree, 90 degree, 180 degree, and 270 degree). An example timing diagram of splitting the received PWM1 signal into four phase control signals (0 DEG, 90 DEG, 180 DEG, and 270 DEG) by the phase generator circuit 225-1 is shown in the timing diagram of FIG. 4.

Figure 4:
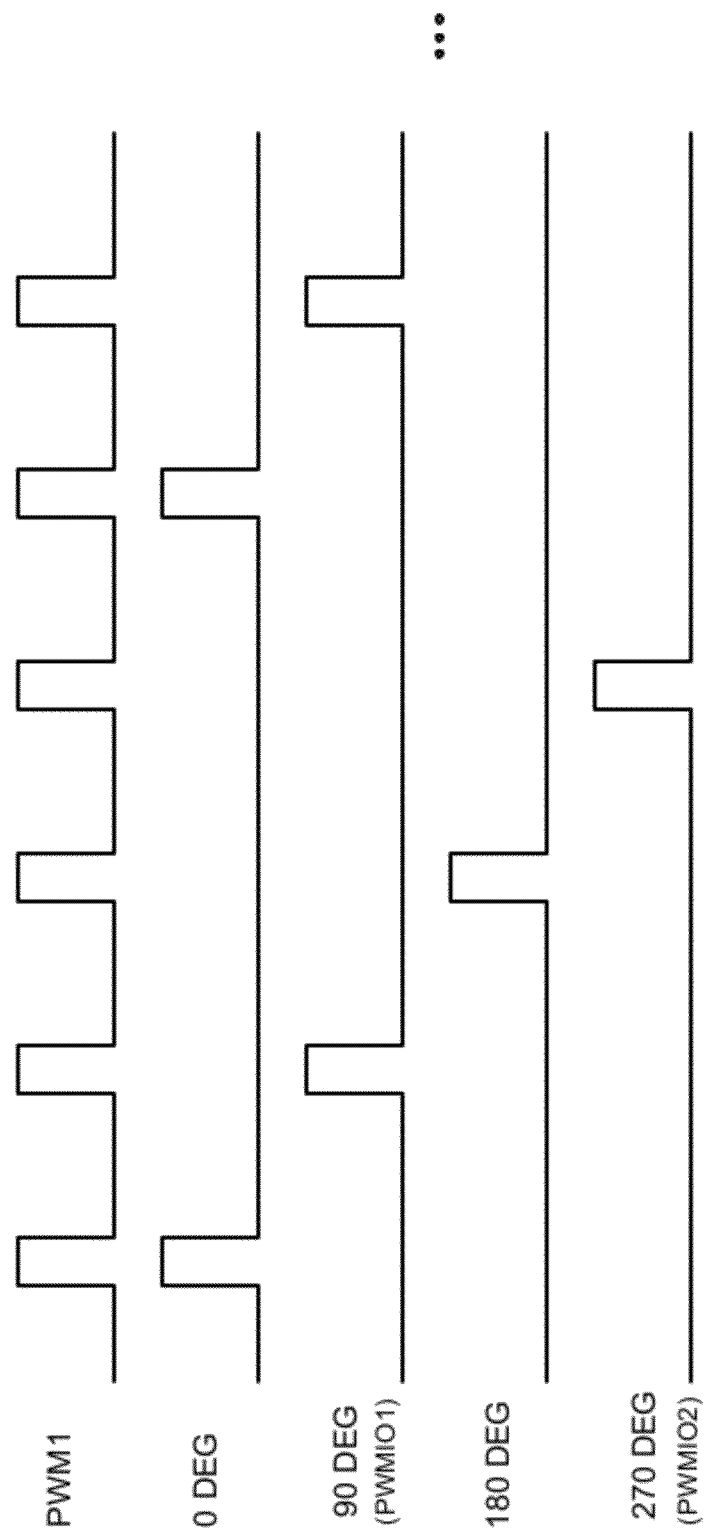
FIG. 4 is an example timing diagram illustrating parsing and expansion of a pulse width modulation control signal into multiple pulse width modulation control signals according to embodiments herein.

As will be discussed later in this specification, the 0 DEG signal produced by the phase generator circuit 225-1 in FIG. 4 is used by the master driver circuit 202-1 to control states of switches associated with power converter phase #1. The master driver circuit 202-1 uses the 180 DEG signal produced by the phase generator circuit 225-1 to control states of switches associated with power converter phase #2. The slave driver circuit 202-2 uses 90 DEG signal produced by the phase generator circuit 225-1 to control states of switches associated with power converter phase #3. The slave driver circuit 202-2 uses the 270 DEG signal produced by the phase generator circuit 225-1 to control states of switches associated with power converter phase #4.

Referring again to FIG. 3, in accordance with the mode setting information 205-1, the master driver circuit 202-1 configures the tri-state control circuit 235-1 to receive at least one signal such as 0 DEG and 180 DEG locally from phase signal generator 225-1 in the master driver circuit 202-1.

The mode information 205-1 inputted to the master driver circuit 202-1 configures the bi-directional interface circuit 230-1 of the master driver circuit 202-1 to output the 90 DEG and 270 DEG signal to the slave driver circuit 202-2 in response to detecting that the master driver circuit 202-1 has been configured as the master.

A combination of the tri-state control circuit 235-1, anti-shoot through circuit 240-1, and switch driver circuit 240-1 of the master driver circuit 202-1 controls switches in phase #1 and phase #2. For example, based on the 0 DEG signal generated by the phase generator circuit 225-1, the master driver circuit 225-1 produces the signal 0 Hi_Gate and 0 Lo_Gate to control phase #1. For example, via the 0 DEG signal, the master driver circuit 202-1 produces the signal 0 Hi_Gate to control a state of switch 221-1 and produces 0 Lo_Gate to control a state of switch 221-2 in power converter phase #1.

Based on the 180 DEG signal generated by the phase generator circuit 225-1, the master driver circuit 202-1 produces the signal 180 Hi_Gate and 180 Lo_Gate to control phase #2. For example, the master driver circuit 202-1 produces the signal 180 Hi_Gate to control a state of switch 222-1 and produces 180 Lo_Gate to control a state of switch 222-2 in power converter phase #2.

The mode information 205-2 causes the slave driver circuit 202-2 to configure the bi-directional interface circuit 230-2 as inputs to receive the 90 DEG and 270 DEG signal outputted by the master driver circuit 202-1.

In the slave driver circuit 202-2, the bi-directional interface circuit 230-2 receives the 90 DEG signal and 270 DEG signal from the master driver circuit 202-1. The bi-directional interface circuit 230-2 transmits the received 90 DEG and 270 DEG signals to the tri-state control circuit 235-2. Thus, in one embodiment, the phase generator circuit 225-2 need not be configured to decode and split the PWM1 signal into multiple phases as the slave driver circuit 202-2 can be configured to rely on the phase controls signals generated by the master driver circuit 202-1 to control phase #3 and phase #4.

A combination of the tri-state control circuit 235-2, anti-shoot through circuit 240-2, and switch driver circuit 245-2 of the slave driver circuit 202-2 controls switching in phase #3 and phase #4.

For example, based on the 90 DEG signal generated by the phase generator circuit 225-1, the switch driver circuit 245-2 produces the signal 90 Hi_Gate and signal 90 Lo_Gate to control respective switches in phase #3. For example, the slave driver circuit 202-2 produces the signal 90 Hi_Gate to control a state of switch 223-1 and produces 90 Lo_Gate to control a state of switch 223-2.

Based on the 270 DEG signal generated by the phase generator circuit 225-1, the slave driver circuit 245-1 produces the signal 270 Hi_Gate and signal 270 Lo_Gate to control phase #4. For example, the slave driver circuit 202-2 produces the signal 270 Hi_Gate to control a state of switch 224-1 and produces 270 Lo_Gate to control a state of switch 224-2 in power converter phase #4.

Note that the bi-directional interface circuit 230-1 can include circuitry from which to transmit the 90 DEG signal and 180 DEG signal between the master driver circuit 202-1 and the slave driver circuit 202-2. Bi-directional interface circuit 230-2 can introduce relatively short delays when transmitting the 90 signal and 270 signal generated by the phase generator circuit 225-1 over respective circuitry and circuit paths to the tri-state control circuit 235-2. In one embodiment, the delays of transmitting the signal from the master driver circuit to the slave driver circuit are negligible compared to a frequency of the signals generated by the phase generator circuit 225-1.

If more precise phase delay matching is desired, the master driver circuit 202-1 can include a delay circuit to delay the 0 DEG signal and 180 DEG signal by an amount that matches the delay in transmitting the 90 signal and the 270 signal from the phase generator circuit 225-1 to tri-state control circuit 235-2. Accordingly, the four signals 0 DEG, 90 DEG, 180 DEG, and 270 DEG can have substantially matched delays so that a spacing of phases is substantially 90 degrees.

As previously discussed, FIG. 4 is a timing diagram illustrating expansion of a pulse width modulation control signal into multiple pulse width modulation control signals according to embodiments herein.

A combination of the PWM decoder circuit 220-1 and the phase generator circuit 225-1 time multiplexes or splits the PWM1 signal into four individual phase control signals 0 DEG, 90 DEG, 180 DEG, and 270 DEG. Accordingly, embodiments herein include expanding a single pulse width modulation signal PWM1 into multiple signals such as four control signals. As shown, the 90 DEG signal (PWMIO1) and 270 DEG signal (PWMIO2) can be transmitted on respective printed circuit board traces between pins of the master driver circuit 202-1 (e.g., a first semiconductor chip device) and pins of the slave driver circuit 202-2 (e.g., a second semiconductor chip device).

In accordance with one embodiment, the master driver circuit 202-1 parses the PWM1 signal into multiple phase control signals based on conditions such as detecting edges and/or different levels of the PWM1 signal, detecting switch control information in respective time slots of the PWM1 signal, etc.

By way of a non-limiting example, the 0 DEG signal can be derived from the PWM1 signal based on detecting a first rising and falling edge transition in the PWM1 signal; the 90 DEG signal can be derived from the PWM1 signal based on detecting a second rising and falling edge transition in the PWM1 signal; the 180 DEG signal can be derived from the PWM1 signal based on detecting a third rising and falling edge transition in the PWM1 signal; the 270 DEG signal can be derived from the PWM1 signal based on detecting a fourth rising and falling edge transition in the PWM1 signal; the subsequent 0 DEG signal can be derived from the PWM1 signal based on detecting a fifth rising and falling edge transition in the PWM1 signal; the subsequent 90 DEG signal can be derived from the PWM1 signal based on detecting a sixth rising and falling edge transition in the PWM1 signal; and so on.

Note that a frequency and duration of PWM1 signals is a design choice and can vary depending on parameters such as inductance of the respective phases and other relevant parameters.

Figure 5:
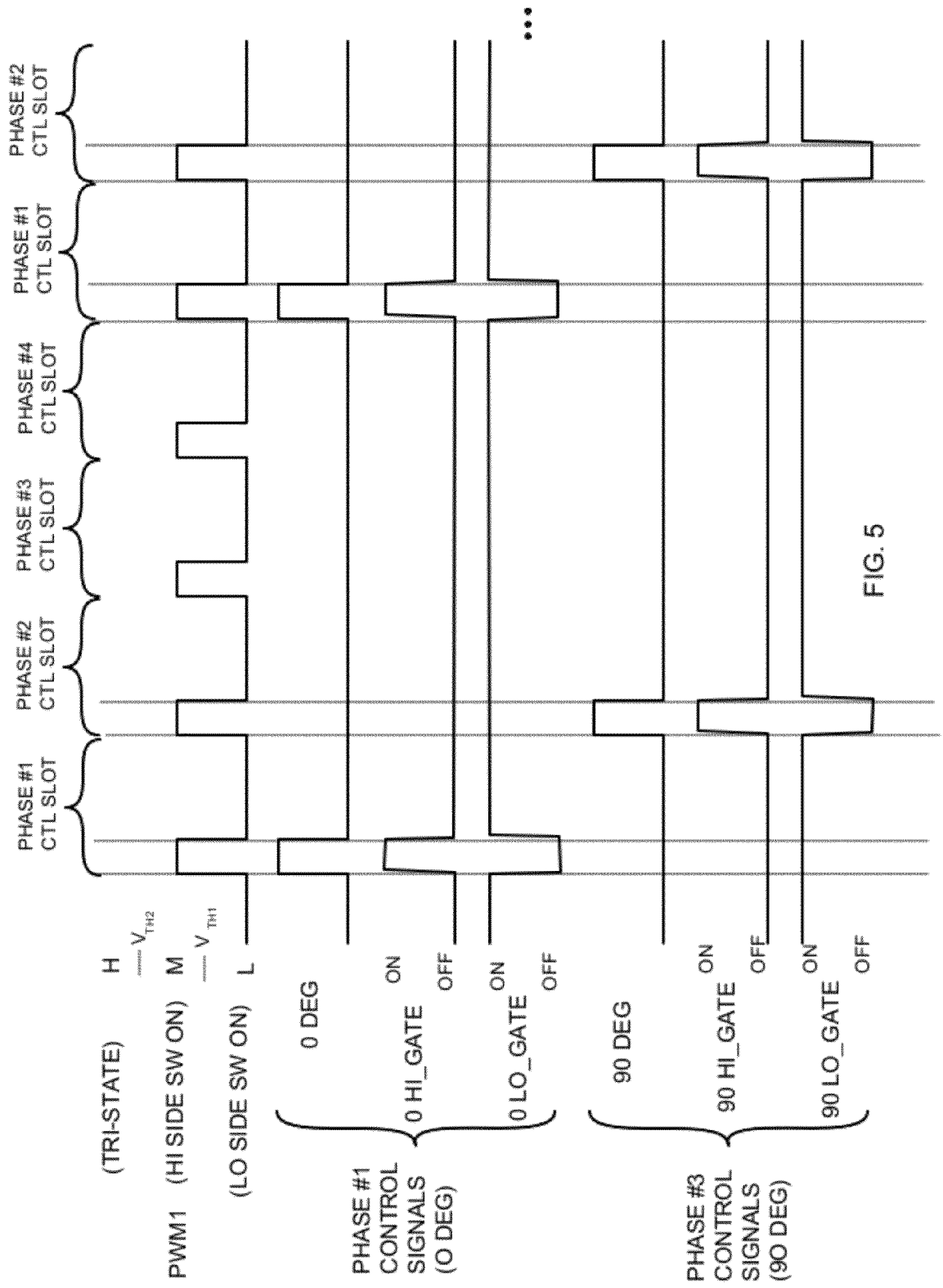
FIGS. 5 and 6 combine to form an example timing diagram illustrating conversion of a received pulse width modulation signal into switch drive signals for controlling respective phases in a power supply according to embodiments herein.
Figure 6:
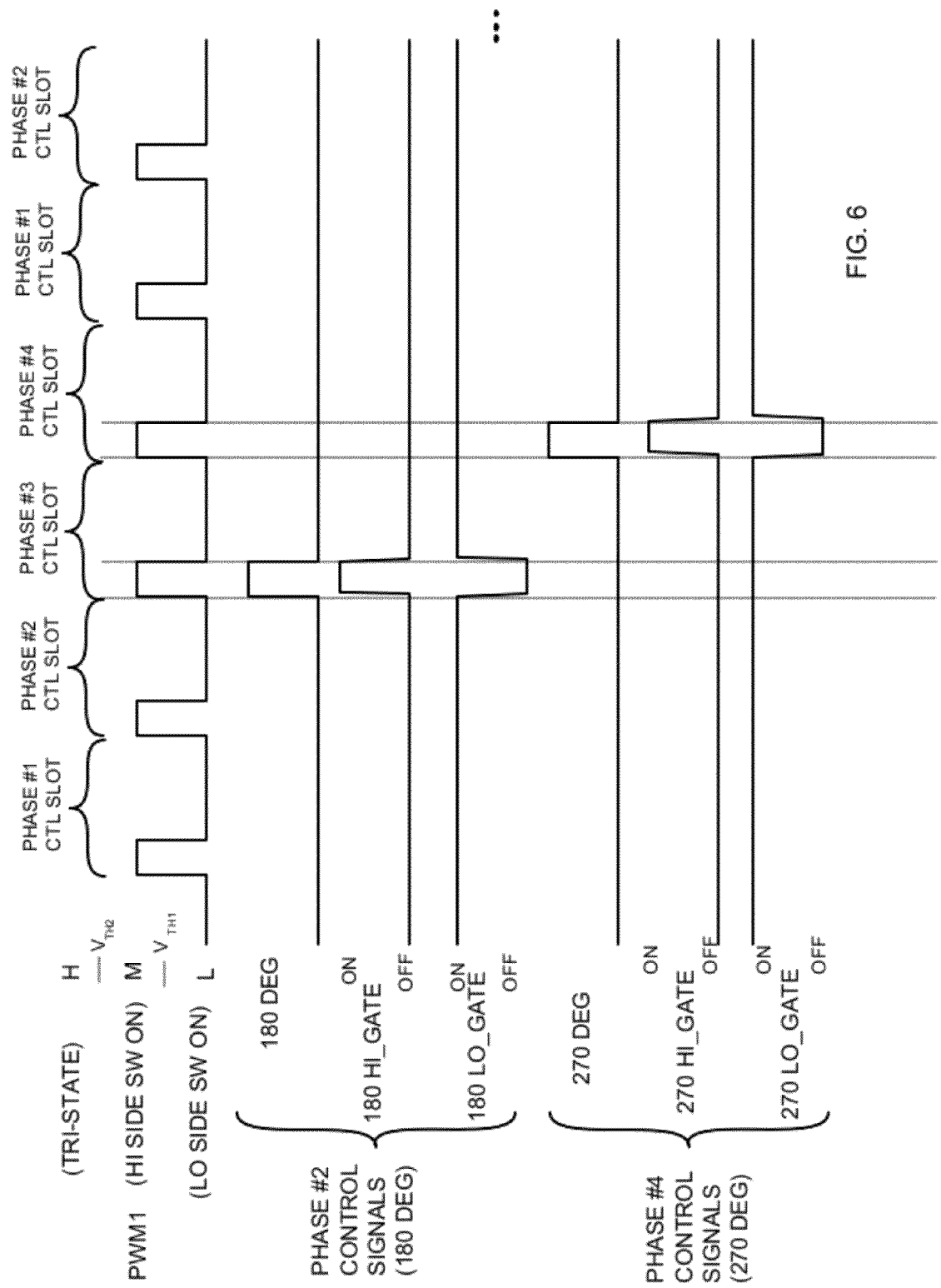

FIGS. 5 and 6 combine to form a timing diagram according to embodiments herein.

As shown, the phase generator circuit 225-1 receives PWM1 signal transitioning between a low level (e.g., L) and a medium level (e.g., M) over time. As previously discussed, the level of the PWM1 indicates how to control respective switches in a power converter phase. For example, the medium level, M, indicates a duration in which to activate a respective control switch (e.g., high side switch) in a phase and deactivate a synchronous switch (e.g., low side switch) in the given phase. The low level, L, indicates a duration in which to deactivate a respective control switch (e.g., high side switch) in a phase and activate a corresponding synchronous switch (e.g., low side switch) in the given phase. Thus, via a single PWM signal switching between a low and medium level, and detecting control signals in different time slots, the controller 210 can control multiple phases in a power supply.

More specifically, the tri-state control circuit 235-1 transmits the 0 DEG and the 180 DEG signals derived from the PWM1 signal to the anti-shoot through circuit 240-1. The anti-shoot through circuit 240-1 and the switch driver circuit 245-1 convert the 0 DEG signal into respective switch control signals 0 Hi_Gate and 0 Lo_Gate as shown to control power converter phase #1. For example, when the 0 DEG signal is logic high, via the 0 Hi_Gate signal, the master driver circuit 202-1 activates a respective high side switch in the power converter phase #1. When the 0 DEG signal is logic low, via the 0 Low_Gate signal, the master driver circuit 202-1 activates a respective low side switch in the power converter phase #1.

In general, the anti-shoot through circuits 240 spaces the ON and OFF edges of the high side switch and the low side switch such that the respective pair of high side switch circuitry and low side switch circuitry in a given phase are not activated at the same time.

A combination of the anti-shoot through circuit 240-1 and the switch driver circuit 245-1 convert the 180 DEG signal into respective switch control signals 180 Hi_Gate and 180 Lo_Gate as shown to control power converter phase #2.

As previously discussed, the master driver circuit 202-1 transmits the 90 DEG and the 270 DEG signals to the slave driver circuit 202-2. In a similar manner as discussed above, the anti-shoot through circuit 240-2 and the switch driver circuit 245-2 receive and convert the 90 DEG signal into respective switch control signals 90 Hi_Gate and 90 Lo_Gate as shown to control power converter phase #3. The anti-shoot through circuit 240-2 and the switch driver circuit 245-2 convert the 270 DEG signal into respective switch control signals 270 Hi_Gate and 270 Lo_Gate as shown to control power converter phase #4.

Based on time slotting of control signals in a control signal such as PWM1, for a given cycle including four consecutive time slots, the controller 210 can activate the control and synchronous switches in each phase for a same amount of time or a different amount of time.

Figure 7:
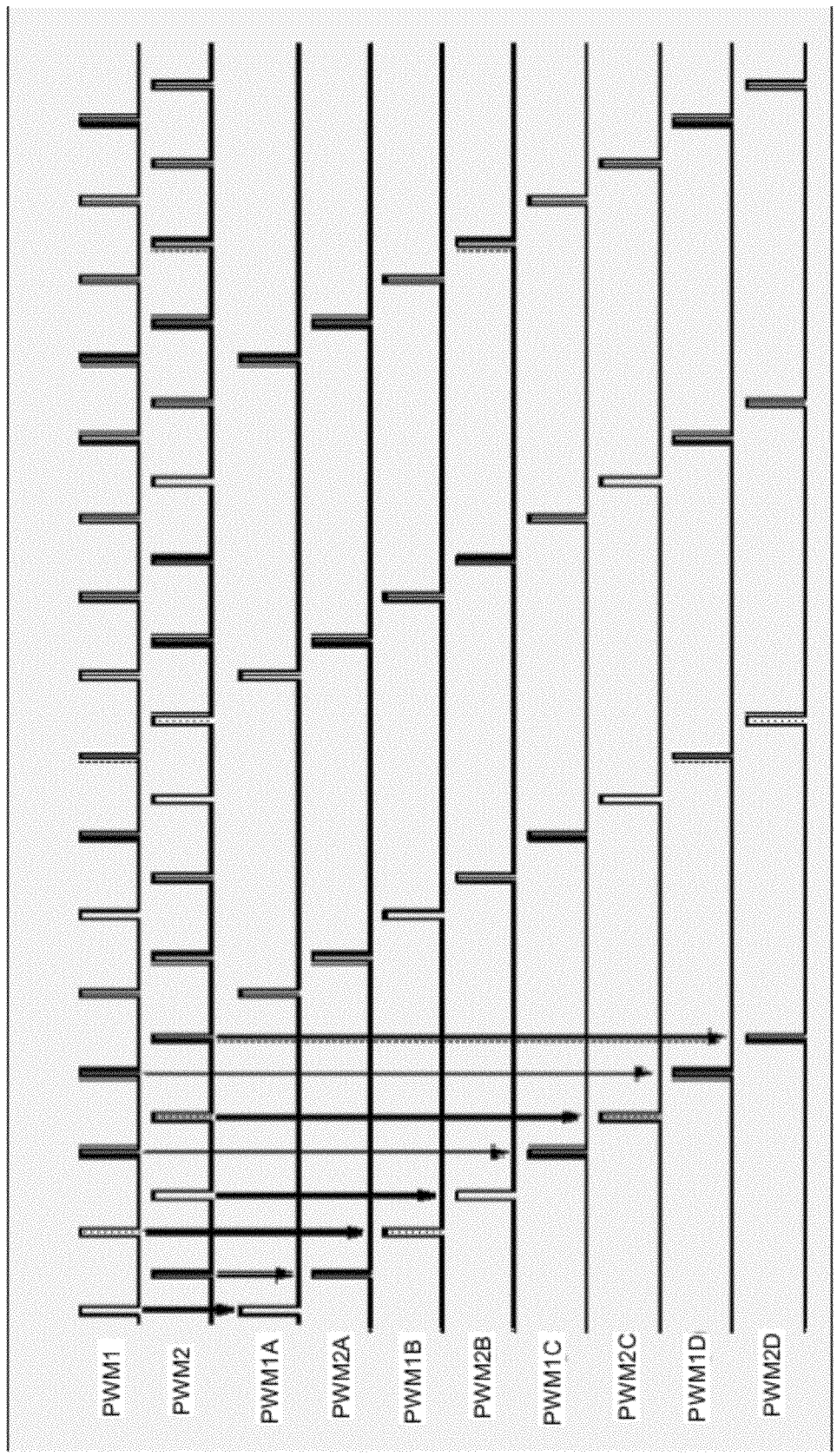
FIG. 7 is an example diagram illustrating expansion of each of two pulse width modulation signals into a respective set of four phase control signals power converter phases according to embodiments herein.

FIG. 7 is an example diagram in which the controller generates signal PWM1 and PWM2 to control two banks of four power converter phases according to embodiments herein.

Assume in this example that the power supply 200 includes a master driver circuit and corresponding slave driver circuit for each of PWM1 signal and PWM2 signal to perform phase quadrupling as discussed herein.

In this example, assume that a first master driver circuit includes respective circuitry to parse PWM1 into four phase control signals (PWM1A, PWM1B, PWM1C, PWM1D) or slots to control 4 respective phases in a first bank. Assume that a second master circuit parses PWM2 into four phase control signals (PWM2A, PWM2B, PWM2C, PWM2D) or slots to control 4 respective phases in a second bank. The conversion of the signal PWM1 into four phase control signals (PWM1A, PWM1B, PWM1C, PWM1D) and conversion of the signal PWM2 into four phase control signals (PWM2A, PWM2B, PWM2C, PWM2D) is shown in FIG. 7.

To reduce a ripple voltage on the output voltage, $V_{OUT}$, powering the load 215, note that the controller 210 offsets or spaces the pulses in PWM1 and PWM2 such that only a given one of the eight phases is activated at a time as shown.

Note further that any suitable number of additional PWM signals such as (PWM3, PWM4, etc.) can be activated to control additional banks of power converter phases in the power supply. For example, a third master circuit can be configured to parse PWM3 into four phase control signals (PWM3A, PWM3B, PWM3C, PWM3D) to control 4 respective phases in a third bank; a fourth master circuit can be configured to parse PWM4 into four phase control signals (PWM4A, PWM4B, PWM4C, PWM4D) to control 4 respective phases in a third bank; and so on. In a manner as previously discussed, the activation pulses in each of the PWM signals can be spaced apart such that respective high side switch circuitry of each active phase (e.g., phase operated in a continuous mode) is activated at different times. In other words, the pulses within each PWM signal can be offset with respect to each other such that the controller 210 switches between activating a phase in each bank over time.

Figure 8:
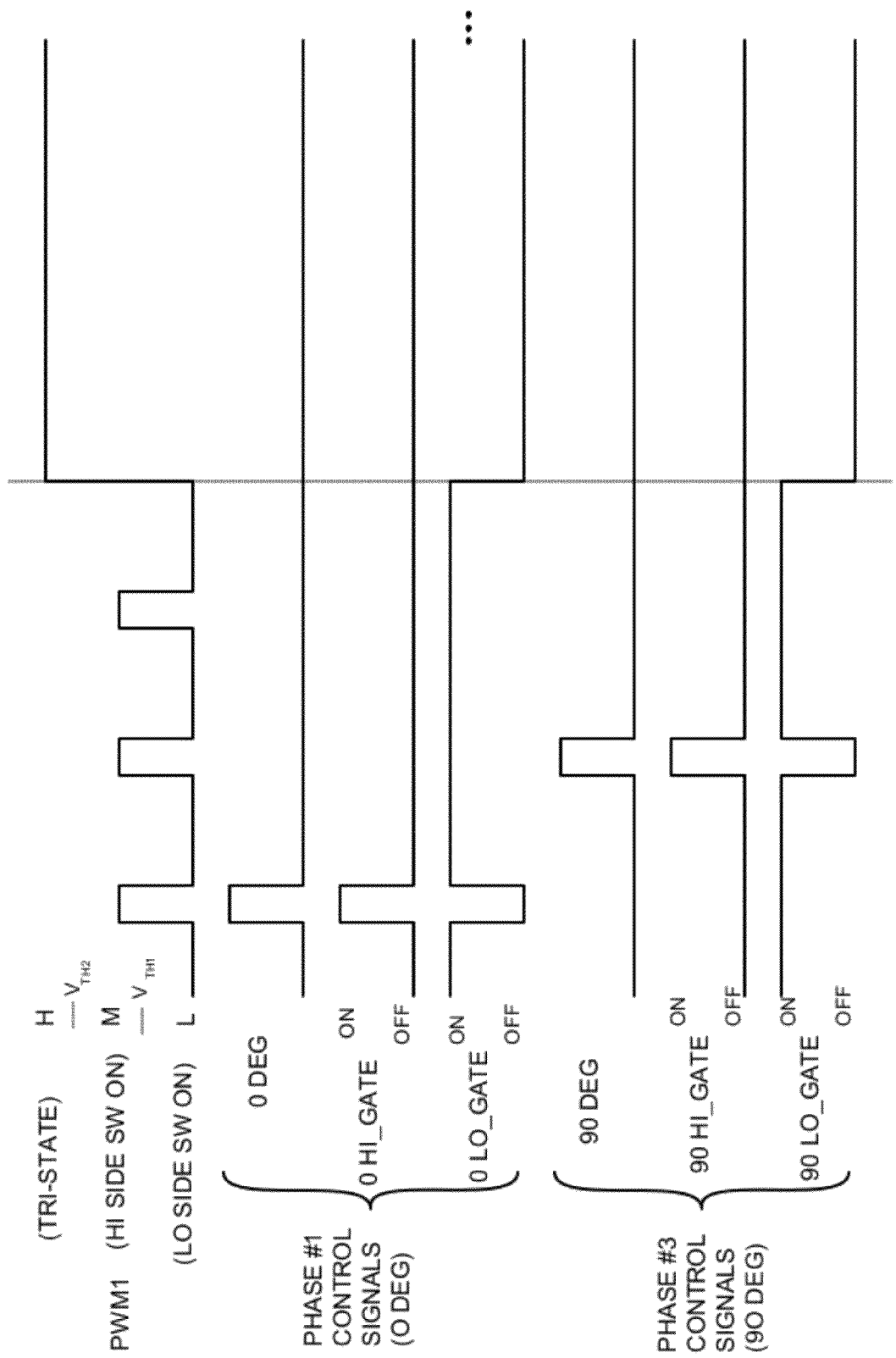
FIG. 8 is an example diagram illustrating detection of a tri-state condition on a received pulse width modulation and corresponding deactivation of phases according to embodiments herein.

FIG. 8 is an example timing diagram illustrating deactivation of phases according to embodiments herein.

In one embodiment, the PWM decoder circuit 220-1 monitors the PWM1 signal. The PWM decoder circuit 220-1 identifies occurrence of a tri-state condition (e.g., logic H) when a magnitude of the PWM1 signal is above threshold value, $V_{TH2}$, for a given amount of time.

The PWM decoder circuit 220-1 identifies occurrence of a middle voltage level (e.g., logic M) when a magnitude of the PWM1 signal is below threshold value, $V_{TH2}$, and above threshold value, $V_{TH1}$.

The PWM decoder circuits 220-1 identifies occurrence of a low voltage level (e.g., logic L) when a magnitude of the PWM1 signal is below threshold value, $V_{TH1}$.

As previously discussed, the switching of the PWM1 signal between a medium (M) and low (L) level results in activation or operation of multiple power converter phases in a continuous operational mode as discussed above in FIGS. 5 and 6. Also, as previously discussed, the PWM decoder circuit 220-1 monitors the level of the inputted PWM1 signal.

In one embodiment as shown in FIG. 8, in response to detecting the PWM1 signal in a third state such as a high state H (tri-state) above $V_{TH2}$, the respective tri-state control circuit 235-1 causes the respective switch driver circuits to turn OFF both high side switch circuitry and low side switch circuitry in each of the multiple phases. Thus, the controller 210 can set the PWM1 signal above threshold value, $V_{TH2}$, to simultaneously deactivate all four phases controlled by PWM1. In other words, when the level of the PWM1 signal is above threshold value, $V_{TH2}$, the switch driver circuit 245-1 and switch driver circuit 245-2 deactivate both the high side switch circuitry and low side switch circuitry in each of the four phases.

Figure 9:
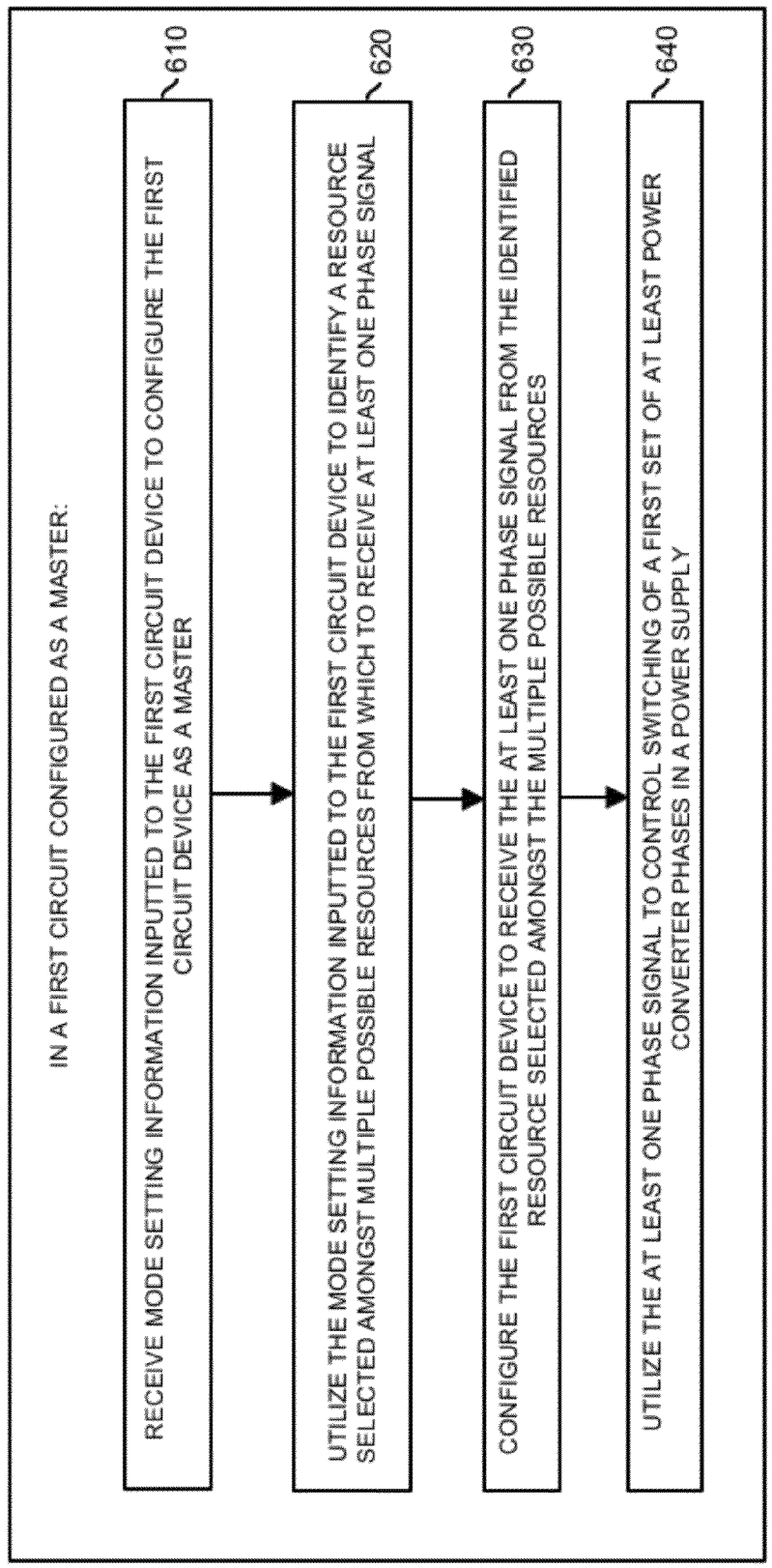
FIGS. 9-12 are flowcharts illustrating example methods according to embodiments herein.

FIG. 9 is a flowchart 600 illustrating an example method of operating switch driver circuitry according to embodiments herein. Note that there will be some overlap with respect to concepts as discussed above. Also, note that the steps in the flowcharts can be executed in any suitable order.

In step 610, a first chip receives mode setting information 205-1 to configure itself as a master driver circuit 202-1.

In step 620, the first chip or the master driver circuit 202-1 utilizes the mode setting information 205-1 to identify a resource (e.g., the phase generator circuit 225-1) selected amongst multiple possible resources (e.g., the phase generator circuit 225-1 or bi-directional interface circuit 230-1) from which to receive at least one phase control signal (e.g., any of the phase control signals generated by phase generator circuit 225-1 derived from PWM1).

In step 630, in accordance with the mode setting information 205-1, the tri-state control circuit 235-1 of the master driver circuit 202-1 receives the at least one phase signal (i.e., the 0 signal and 180 signal) generated by phase generator circuit 225-1.

In step 640, the master driver circuit 202-1 utilizes the at least one phase signal (e.g., the 0 DEG signal and/or 180 DEG signal) received from the phase generator circuit 225-1 to control switching of a first set of at least one power converter phases (e.g., phase #1 and/or phase #2) in power supply circuit 200. For example, in one embodiment, the master driver circuit 202-1 uses the 0 DEG signal generated by the phase generator circuit 225-1 to control switching of switches 221 in phase #1. The master driver circuit 202-1 uses the 180 DEG signal generated by the phase generator circuit 225-1 to control switching of switches 222 in phase #2.

Figure 10:
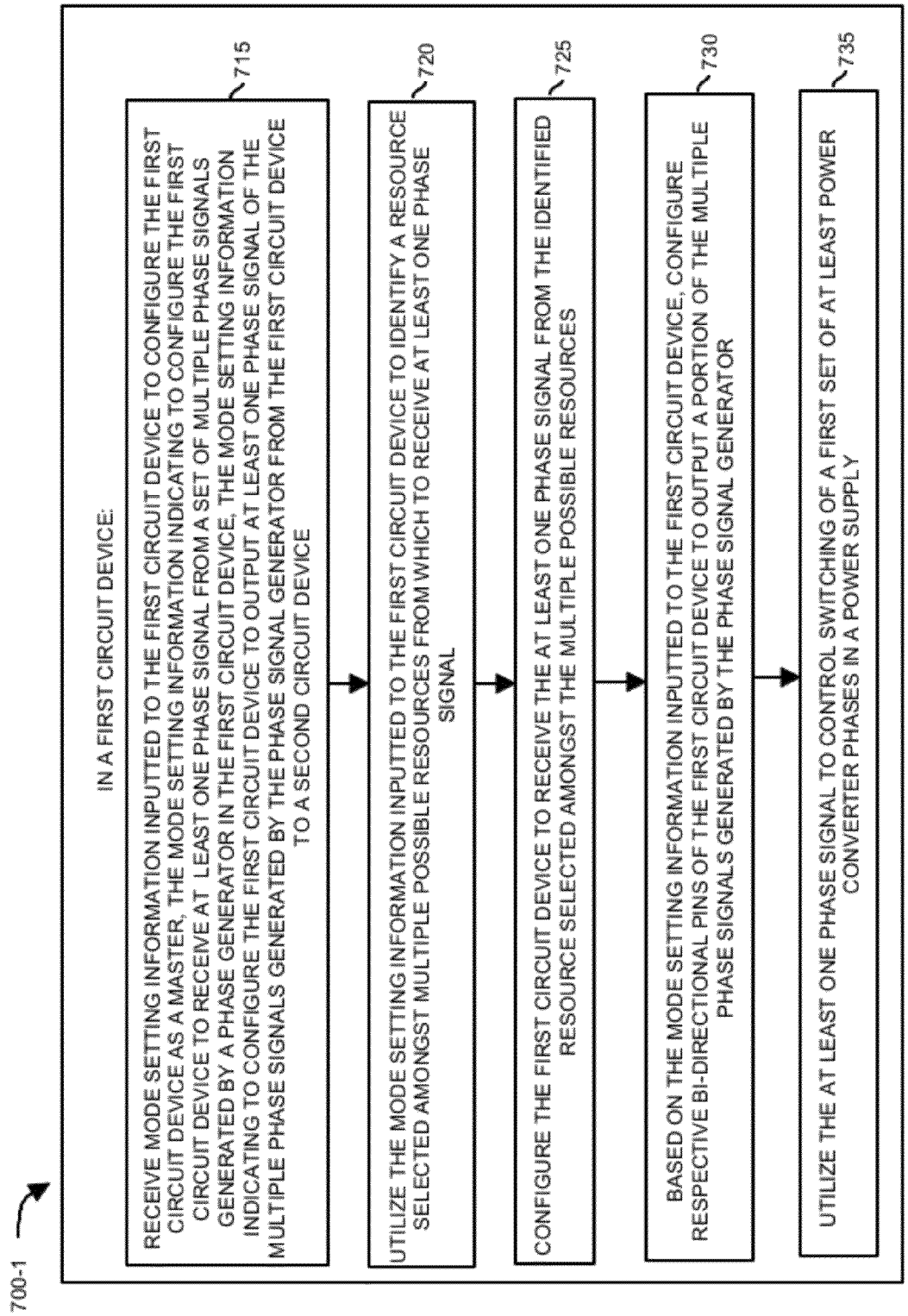
Figure 11:
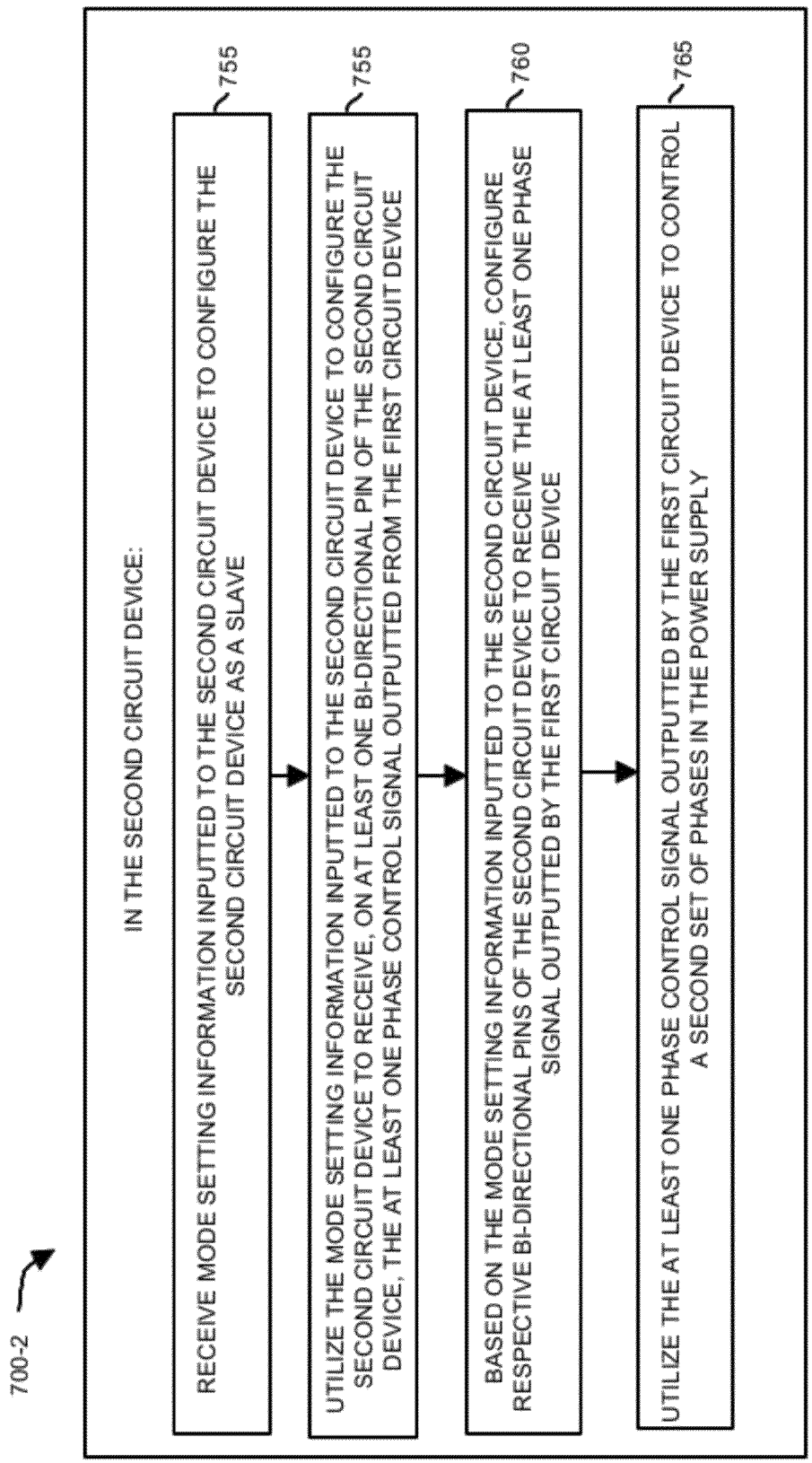

FIGS. 10 and 11 combine to form flowchart 700 (e.g., flowchart 700-1 and flowchart 700-2) illustrating a more detailed example of the master/slave phase driver circuitry in a power supply according to embodiments herein. Note that there will be some overlap with respect to concepts as discussed above. The steps below can be executed in any suitable order.

In step 715 of flowchart 700-1, a first chip receives mode setting information 205-1 indicating to configure itself as a master driver circuit 202-1. In one embodiment, the mode setting information 205-1 indicates to configure a tri-state control circuit 235-1 in the first chip to receive at least one phase signal from a set of multiple phase signals generated by the phase generator 225-1 in the master driver circuit 202-1. The mode setting information 205-1 further indicates to configure the first chip (or master driver circuit 202-1) to output at least one phase signal of the multiple phase signals (e.g., any or all of the 0 DEG signal, 90 DEG signal, 180 DEG signal, or 270 DEG signal) generated by the phase signal generator 225-1 from the master driver circuit 202-1 to a second chip such as slave driver circuit 202-2.

In step 720, the master driver circuit 202-1 utilizes the mode setting information 205-1 to identify a resource selected amongst multiple possible resources (e.g., the phase generator circuit 225-1 or the bi-directional interface circuit 230-1) from which to receive at least one phase signal.

In step 725, based on the mode setting information 205-1, the master driver circuit 202-1 configures the tri-state control circuit 235-1 to receive the at least one phase signal (e.g., the 0 DEG signal and 180 DEG signal) from the identified resource selected amongst the multiple possible resources.

In step 730, based on the mode setting information 205-1 inputted to the first chip, the first chip or master driver circuit 202-1 configures respective bi-directional pins in the bi-directional interface circuit 230-1 to output a portion (e.g., the 90 DEG signal and 270 DEG signal) of the multiple phase signals generated by the phase signal generator circuit 225-1.

In step 735, the master driver circuit 202-1 utilizes the at least one phase signal (e.g., the 0 DEG signal and 180 DEG signal) to control switching of a first set of at least power converter phases (e.g., phase #1 and phase #2) in power supply 200.

In step 750 of FIG. 8, a second chip in the power supply 200 receives mode setting information 205-2 to configure itself as a slave driver circuit 202-2.

In step 755, the second chip utilizes the received mode setting information 205-2 to configure the slave driver circuit 202-2 to receive, on at least one bi-directional pin of the slave driver circuit 202-2, the at least one phase control signal (e.g., the 0 signal and/or 180 signal) outputted from the master driver circuit 202-1 in lieu of receiving phase control signals from the phase generator circuit 225-2.

In step 760, based on the mode setting information inputted to the second circuit device, configure respective bi-directional pins in the bi-directional interface circuit 230-2 to receive the at least one phase signal (e.g., the 90 DEG signal and/or 270 DEG signal) outputted by the master driver circuit 202-1.

In step 765, the slave driver circuit 202-2 utilizes the at least one phase control signal (e.g., the 90 DEG signal and/or 270 DEG signal) outputted by the master driver circuit 202-1 to control a second set of phases (e.g., phase #3 and phase #4) in the power supply 200.

Figure 12:
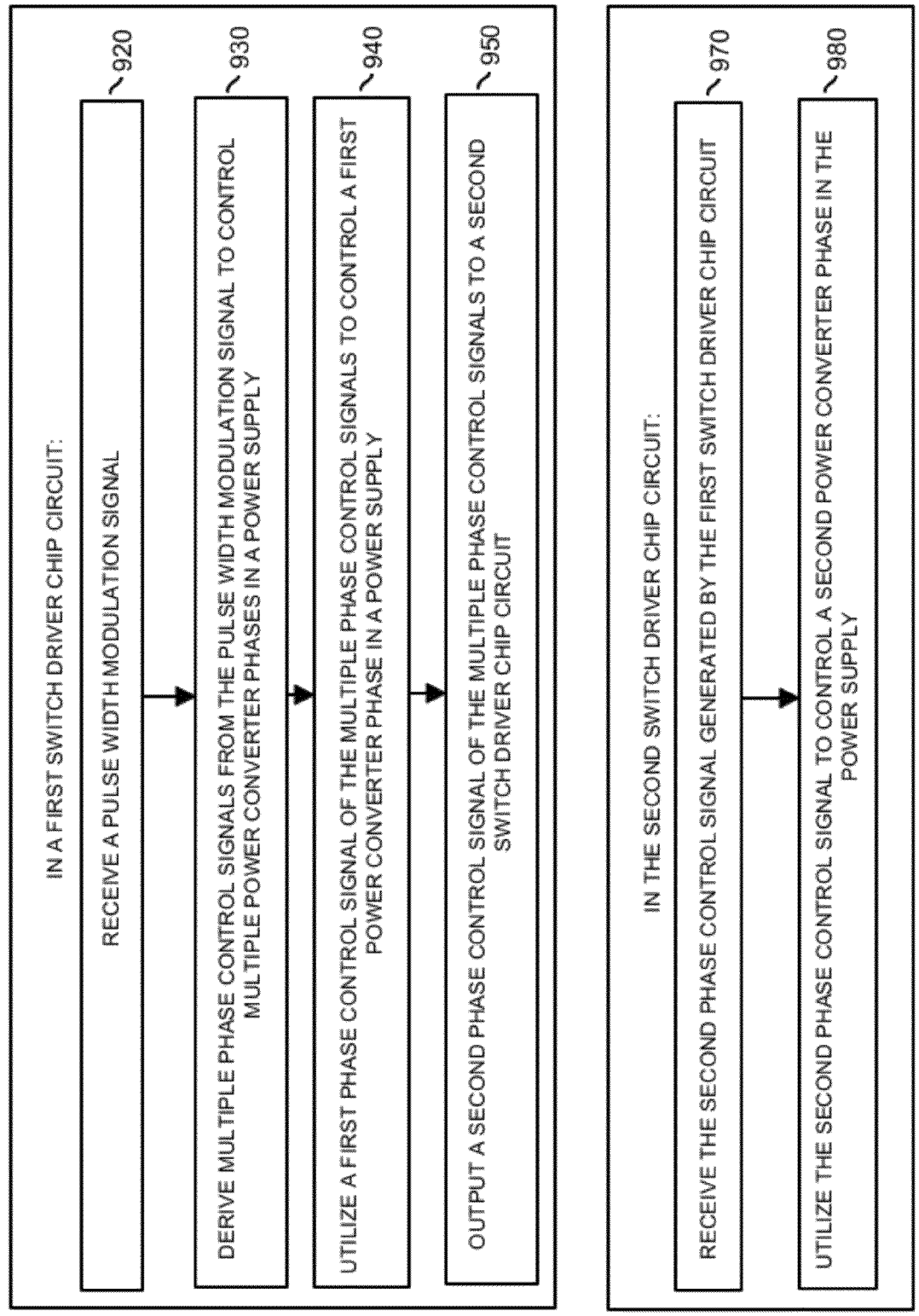

FIG. 12 is a flowchart 900 illustrating another example flowchart 900 illustrating a master/slave driver circuit configuration according to embodiments herein. Note that there will be some overlap with respect to concepts as discussed above. The steps below can be executed in any suitable order.

In step 920, a first switch driver circuit such as master driver circuit 202-1 receives a pulse width modulation signal, PWM1.

In step 930, via the phase generator circuit 225-1, the master driver circuit 202-1 derives multiple phase control signals (e.g., 0 DEG signal, 90 DEG signal, 180 DEG signal, and/or 270 DEG signal) from the pulse width modulation signal PWM1 to control multiple power converter phases in a power supply 200.

In step 940, the master driver circuit 202-1 utilizes a first phase control signal (e.g., the 0 DEG signal) of the multiple phase control signals to control a first power converter phase (e.g., phase #1) in power supply 200.

In step 950, the master driver circuit 202-1 outputs a second phase control signal (e.g., 90 DEG signal) of the multiple phase control signals to the slave driver circuit 202-2 of power supply 200.

In step 970, the master driver circuit 202-2 receives the second phase control signal (e.g., 90 DEG signal) generated by the phase generator circuit 225-1 in the master driver circuit 202-1.

In step 980, the master driver circuit 202-2 utilizes the second phase control signal (e.g., 90 DEG signal) to control a second power converter phase (e.g., phase #3) in the power supply 200.

Figure 13:
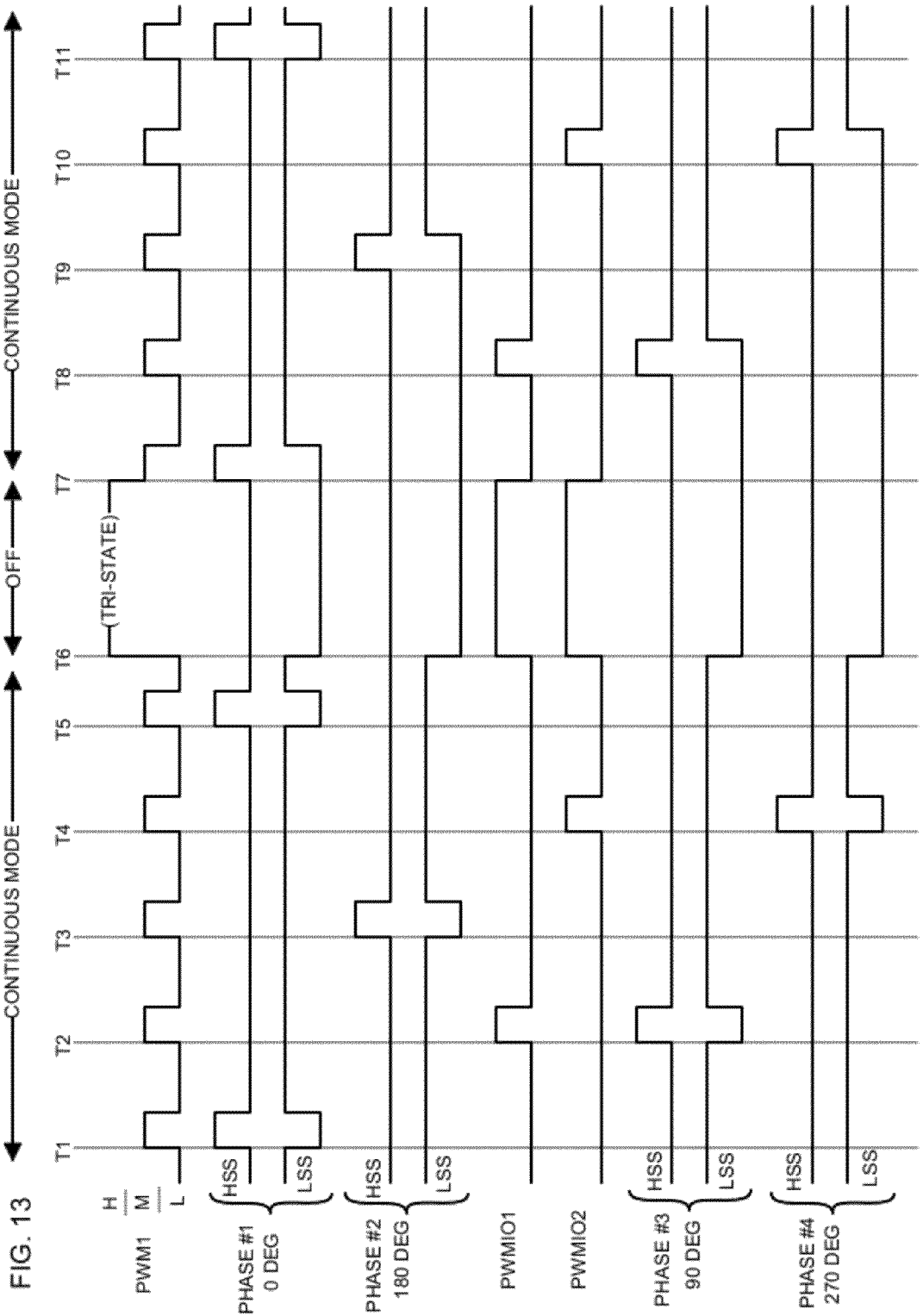
FIG. 13 is an example timing diagram illustrating an ability to control phases in a power supply in accordance with a three-state phase control signal according to embodiments herein.

FIG. 13 is an example timing diagram illustrating an ability to control phases in a power supply using a three-state signal according to embodiments herein. The discussion of FIG. 13 below will include references to matter discussed in FIGS. 2 and 3 as well as other figures.

In the following figures, note that HSS denotes a respective high side switch (e.g., control or power switch circuitry); LSS denotes a respective low side switch (e.g., synchronous switch circuitry) in a respective power converter phase. As previously discussed with respect to FIG. 2, each of the phases can include an energy storage device such as an inductor to provide power to a load.

As shown in FIG. 13, the PWM1 signal inputted to pulse width modulation decoder 220-1 varies amongst three states—H, M, and L. Toggling of the PWM1 signal between state M and state L between time T1 and time T6 causes phase #1, phase #2, phase #3, and phase #4 to operate in a continuous mode as shown. For example, the PWM1 pulse between T1 and T2 activates phase #1; the PWM1 pulse between T2 and T3 activates phase #2; the PWM1 pulse between T3 and T4 activates phase #3; the PWM1 pulse between T4 and T5 activates phase #4.

Setting of the PWM1 signal between T6 and T7 disables all of the phases 1 through 4. More specifically, while in the continuous mode between time T1 and T2, the master driver circuit 202-1 initiates turning ON a high side switch 221-1 of phase #1 (e.g., 0 DEG) for a first portion of the duration between time T1 and T2 while low side switch 221-2 is OFF. This is followed by turning ON low side switch 221-2 of phase #1 (e.g., 0 DEG) for a second portion of the duration between time T1 and time T2 while high side switch 221-1 is OFF. Between time T1 and T2, the master driver circuit 202-1 controls the high side switches in other phases (e.g., phase #3, #2, and #4) to be OFF while the low side switch circuitry is turned ON. The controller controls each of the phases in a similar manner.

As shown, between time T2 and T3, the master driver circuit 202-1 sets the signals PWMIO1 and PWMIO2 from bi-directional interface 230-1 to slave driver circuit 202-2 to the levels shown to activate high side switch 223-1 of phase #2 (e.g., 90 DEG). For example, between time T2 and T3, via setting PWMIO1 to a high state, the master driver circuit 202-1 initiates turning ON high side switch 223-1 of phase #2 (e.g., 90 DEG) for a duration while low side switch 223-2 is OFF. This is followed by turning ON low side switch 223-2 for a duration while high side switch 223-1 is OFF. Thus, while PWMIO2 is set to a low state, PWMIO1 controls switching of high side switch 223-1 and low side switch 223-2. Between time T2 and T3, the master driver circuit 202-1 controls the high side switches in other phases (e.g., phase #1, #3, and #4) to be OFF while the low side switch circuitry is turned ON.

Between T3 and T4, the master driver circuit 202-1 initiates turning ON high side switch 222-1 of phase #3 (e.g., 180 DEG) for a duration while low side switch 222-2 is OFF followed by turning ON low side switch 222-2 for a duration while high side switch 222-1 is OFF. Between time T3 and T4, the master driver circuit 202-1 controls the high side switches in other phases (e.g., phase #1, #2, and #4) to be OFF while the low side switch circuitry is turned ON.

Between time T4 and T5, the master driver circuit 202-1 sets the signals PWMIO1 and PWMIO2 from bi-directional interface 230-1 to slave driver circuit 202-2 to the levels shown to activate high side switch 224-1 of phase #4 (e.g., 270 DEG). For example, between time T4 and T5, via setting PWMIO2 to a high state for a duration as shown. In response, the master driver circuit 202-1 initiates turning ON high side switch 224-1 of phase #4 (e.g., 270 DEG) for a duration while low side switch 224-2 is OFF followed by turning ON low side switch 224-2 for a duration while high side switch 224-1 is OFF. Thus, while PWMIO1 is set to a low state note that time T4 and T5, PWMIO2 controls switching of high side switch 224-1 and low side switch 224-2.

Between time T4 and T5, the master driver circuit 202-1 controls the high side switches in other phases (e.g., phase #1, #2, and #3) to be OFF while the low side switches are turned ON.

The controller starts a new cycle until time T6. At such time, T6, the PWM1 signal becomes a state H. This corresponds to a tri-state (e.g., disable mode) in which the master driver circuit 202-1 turns all of the high side switches and low side switches of the phases 1-4 to an OFF state.

Locally, during the detected tri-state or disable condition, the switch driver circuit 245-1 deactivates all high side switches and low side switches in phase #1 and phase #2 as shown. Detection of PWM1 in the H state also causes the master driver circuit 202-1 to set simultaneously set output signals PWMIO1 and PWMIO2 to high states as shown. Upon detecting these levels at the slave driver circuit 202-2, the slave driver circuit 202-2 initiates deactivation of all high side switches and low side switches in phase #3 and phase #4 as shown.

At time T7, the controller 210 discontinues setting PWM1 to the H state (e.g., tri-state) and subsequently reactivates the phases 1-4 after time T7. For example, the master driver circuit 202-1 initiate activation of each of the phases again in a specific order (e.g., phase #1 is activated first, phases #3 is activated second, phase #2 is activated third, phase #4 is activated fourth) as in the last setting of the continuous mode. Thus, embodiments herein can include initiating reactivation of the multiple power converter phases in accordance with a predetermined reactivation order subsequent to detecting the phase disable mode (e.g., tri-state mode).

Each of the switch driver circuits 245 can include latching circuitry that shuts off the high side switches and low side switches during the tri-state condition. The latching circuitry prevents the low side switches in the respective phases from turning ON until after a respective high side switch in the respective phase has been turned ON and subsequently turned OFF. Thus, via the latch circuitry in switch driver circuit 245-2, the slave driver circuit 202-2 prevents activation of low side switch circuitry in one or more phases controlled by the slave driver circuit 202-2 until after respective high side switch circuitry in a respective phase controlled by the second switch driver chip circuit has been activated. Via the latch circuitry in switch driver circuit 245-1, the master driver circuit 202-1 prevents activation of low side switch circuitry in one or more phases controlled by the master driver circuit 202-1 until after respective high side switch circuitry in a respective phase controlled by the second switch driver chip circuit has been activated.

More specifically, between time T7 and time T8, while all other high side switches and low side switches are OFF, the master driver circuit 202-1 initiates reactivation of phase #1 by first turning ON the high side switch 221-1 while low side switch 221-2 is OFF. Low side switch 221-2 is OFF from time T6 up until the time that the high side switch 221-1 is turned OFF between time T7 and time T8. After the high side switch 221-1 is deactivated between time T7 and T8, the master driver circuit 202-1 initiates activation of the low side switch 221-2. After being reactivated, while in the continuous mode, the master driver circuit 202-1 switches between activating the high side switch 221-1 and the low side switch 221-2 in subsequent activation cycles while in the continuous mode. That is, after reactivation and while in the continuous mode, either the high side switch 221-1 or the low side switch 221-2 is ON.

Between time T8 and time T9, while all high side switches and low side switches in phase #2 and phase #4 are OFF, the master driver circuit 202-1 initiates reactivation of phase #3 by first turning ON the high side switch 223-1 while low side switch 223-2 is OFF. Low side switch 223-2 has not been activated since the tri-state condition occurring at time T6. After the high side switch 221-1 is deactivated as shown between time T8 and T9, the latch circuitry is reset for phase #2 and the slave driver circuit 202-2 initiates activation of the low side switch 223-2. After being reactivated, while in the continuous mode, and in accordance with the PWMIO1 and PWMIO2 signals, the slave driver circuit 202-2 switches between activating the high side switch 223-1 and the low side switch 223-2 in a manner as previously discussed. That is, after reactivation and while in the continuous mode, either the high side switch 223-1 or the low side switch 221-3 is ON in accordance with the PWMIO1 and PWMIO2 signals.

Between time T9 and time T10, while the high side switch and low side switch in phase #4 are still OFF, the master driver circuit 202-1 initiates reactivation of phase #3 by first turning ON the high side switch 222-1 while low side switch 222-2 is OFF. Low side switch 222-2 is held OFF from time T6 up until the time that the high side switch 222-1 is turned OFF between time T9 and time T10. Thus, after the high side switch 222-1 is deactivated between time T9 and T10, the master driver circuit 202-1 initiates activation of the low side switch 222-2. Thus, the low side switch 222-2 is not reactivated until after the high side switch 222-1 has been activated and turned OFF. After being reactivated, while in the continuous mode, the master driver circuit 202-1 switches between activating the high side switch 222-1 and the low side switch 222-2 in a manner as previously discussed. That is, after reactivation and while in the continuous mode, either the high side switch 221-1 or the low side switch 221-2 is ON.

Between time T10 and time T11, the master driver circuit 202-1 initiates reactivation of phase #4 by first turning ON the high side switch 224-1 while low side switch 224-2 is OFF. Low side switch 224-2 has not been activated since the tri-state condition occurring at time T6. After the high side switch 224-1 is deactivated between time T10 and T11, the master driver circuit 202-1 initiates activation of the low side switch 224-2. Thus, the low side switch 224-2 is not reactivated until after the high side switch 224-1 has been activated and turned OFF during reactivation. After being reactivated, while in the continuous mode, the master driver circuit 202-1 switches between activating the high side switch 224-1 and the low side switch 224-2 in a manner as previously discussed. That is, after reactivation and while in the continuous mode, and in accordance with the PWMIO1 and PWMIO2 signals, the slave driver circuit 202-2 toggles between turning ON the high side switch 224-1 and the low side switch 224-2.

As may be noted, the state of the PWMIO1 and PWMIO2 signals indicate how to control switches in the phases directly controlled by the slave driver circuit 202-2. For example, setting of both PWMIO1 and PWMIO2 signals to a high state indicates to the slave driver circuit 202-2 to disable both high side switch circuitry and low side switch circuitry in each of phases #3 and #4. When not in a disable mode, PWMIO1 controls settings of high side switch circuitry and low side switch circuitry of phase #3. When not in a disable mode, PWMIO2 controls settings of high side switch circuitry and low side switch circuitry of phase #3. Thus, two binary signals (PWMIO1 and PWMIO2) transmitted from the master driver circuit 202-1 to the slave driver circuit 202-2 can be used indicate multiple different states such as activate high side switch circuitry while low side switch circuitry is deactivated, activate low side switch circuitry while high side switch circuitry is deactivated, or disable each phase.

In accordance with one embodiment, while in the continuous mode, the master driver circuit 202-1 and slave driver circuit 202-2 can be configured to repeatedly activate the phases in a particular order such as activation of phase #1 followed by activation of phase #3 followed by activation of phase #2 followed by activation of phase #4 followed by activation of phase #1, etc. A tri-state condition can occur at any time during the activation order; deactivation of all phases can occur immediately without finishing out the order. Upon exiting a tri-state mode, during which all respective high side switches and low side switches of the phases are deactivated, the master driver circuit 202-1 and slave driver circuit 202-2 can be configured to reactivate the phases in the order starting with phase #1 followed by phase #3 followed by phase #2 and so on.

Figure 14:
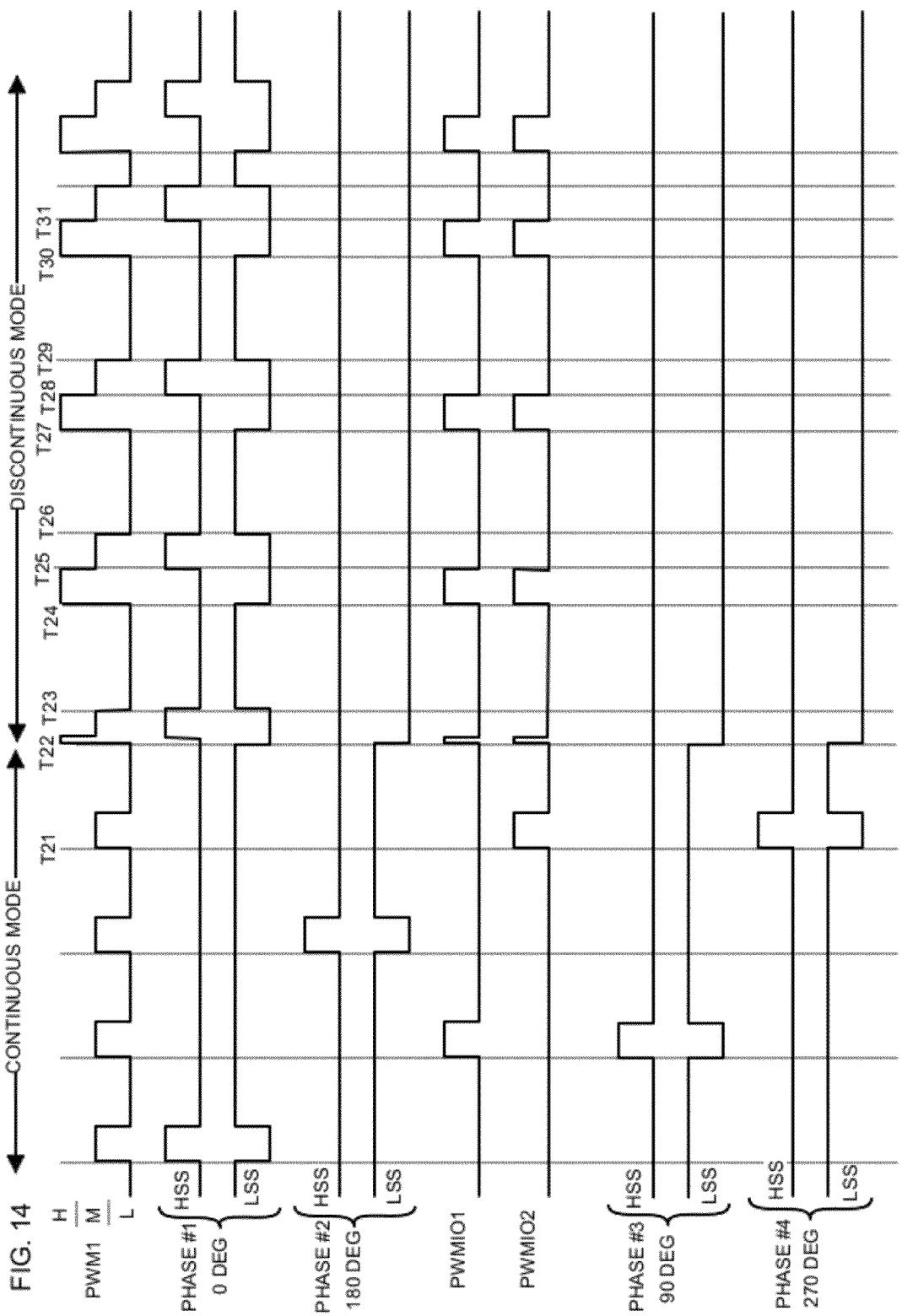
FIG. 14 is an example timing diagram illustrating a transition from a continuous operational mode to a discontinuous operational mode according to embodiments herein.

FIG. 14 is an example timing diagram illustrating a transition of controlling phases from a continuous mode to a discontinuous mode according to embodiments herein.

As shown in the timing diagram of FIG. 14, during the continuous mode (such as before time T22), the controller 210 produces the PWM1 signal to activate phase #1 through

4 in a similar manner as previously discussed. To operate in a discontinuous mode such as when the load 215 requires relatively little current or power, the controller 210 sets the PWM1 signal to tri-state (e.g., H state) for a portion of the duration between time T22 and time T23. For example, setting the PWM1 signal to the tri-state has the affect of turning OFF all high side switches and all low side switches in phase #1 through phase #4.

During the disable mode (e.g., H state) as discussed above, the master driver circuit 202-1 detects the condition and locally deactivates high side switches 221-1 and 222-1 and low side switches 221-2 and 222-2. Also, detecting that the PWM1 signal is set to the H state causes the master driver circuit 202-1 to set the PWMIO1 signal and PWMIO2 signal to logic high states as shown. Based on setting of the PWMIO1 signal and PWMIO2 signal to logic high states causes the slave driver circuit 202-2 to immediately turn high side switches 223-1 and 224-1 and low side switches 223-2 and 223-4 to an OFF state. When disabled due to a tri-sate mode, phase #2 and phase #4 therefore discontinue contributing to supplying current to the load 215.

During the discontinuous mode, the controller 210 can generate states of the PWM1 such that only phase #1 is activated as shown. Specific operation of an example power supply in discontinuous mode is discussed in related U.S. patent application Ser. No. 12/828,857 entitled "POWER SUPPLY SWITCHING AND DISCONTINUOUS POWER SUPPLY MODE," filed on Jul. 1, 2010, the entire teachings of which are incorporated herein by this reference. U.S. patent application Ser. No. 12/828,857 is related to and claims the benefit of earlier filed U.S. Provisional Patent Application Ser. No. 61/308,229 entitled "Discontinuous Mode with Calculated Synchronous Detector On-time," filed on Feb. 25, 2010, the entire teachings of which are also incorporated herein by this reference.

In general, during the discontinuous mode, the controller 210 sets states of the PWM1 signal to repeat the sequence of setting the PWM1 signal to tri-state (e.g., H), followed by setting the PWM1 signal to turn the high side switch ON (e.g., M), followed by setting the PWM1 signal to turn the low side switch ON (e.g., L). In other words, the PWM1 signal is set to a sequence of H, M, L during each of the cycles between T22 and T24, T24 and T27, T27 and T30, etc.

Figure 15:
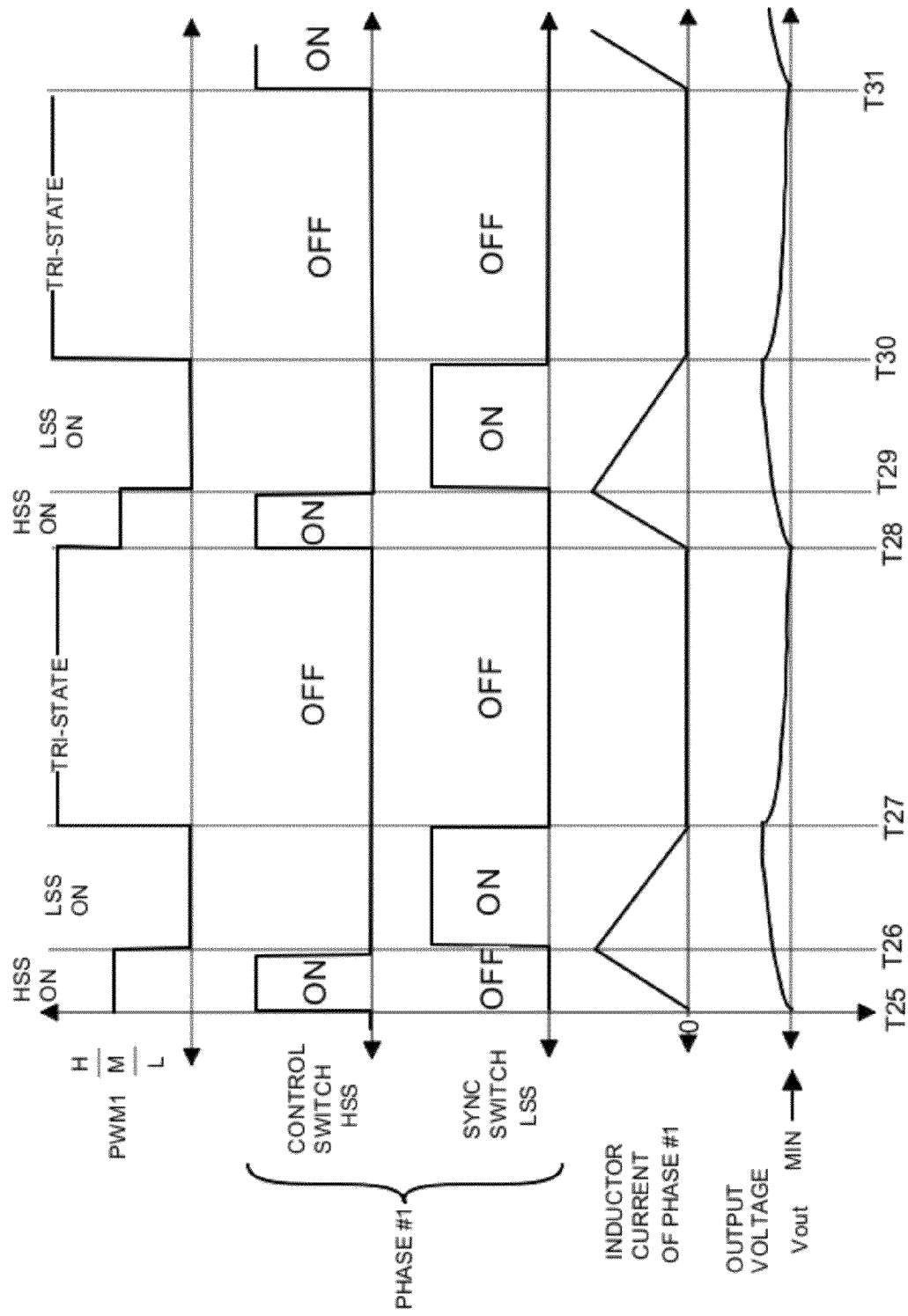
FIG. 15 is an example more detailed timing diagram illustrating operation of phases in a discontinuous mode according to embodiments herein.

FIG. 15 is an example timing diagram illustrating a more detailed operation of phase #1 in a discontinuous mode according to embodiments herein. As shown, between time T25 and T26, the controller 210 sets the PWM1 signal to an M state. This causes the master driver circuit 202-1 to turn ON only the high side switch 221-1 of phase #1.

Further, as shown, in accordance with the PWM1 signal, the controller 210 controls the switches in phase #1 ON and OFF (while switches in other phases #2, #3, and #4 are OFF) to prevent or reduce an amount of negative current from flowing through the respective inductor of phase #1.

In accordance with one example embodiment, the following calculations apply to a buck converter application:

ON_t represents the on time of the control switch (e.g., high side switch 221-1) and is programmable.

During high side switch ON_t (e.g., a time between T25 and T26) in FIG. 15, the current in the respective inductor in phase #1 rises from 0 to a value of $(ON\_t-Dr\_tt)*(Vin-Vout)/L$. As mentioned above, Dr_tt is a correction factor and varies depending on the driver circuit. In this example Vin is 12 volts, the voltage applied to the drains of respective high side switch circuitry.

During ON_t between time T25 and T26, $L*di/dt=(Vin-Vout)$.

Via a current estimation and mode control algorithm, the controller 210 calculates the OFF_t between time T26 and T27 (e.g., amount of time that controller activates low side switch 221-2 and deactivates high side switch 221-1). The OFF_t represents the amount of time needed approximately discharge substantially all of the current in the respective inductor of phase #1 to a value of zero after the high side switch has been activated for the known duration between time duration T25 and T26.

During OFF_t (e.g., between time T26 and time T27) when the low side switch 221-2 (e.g., synchronous switch) is activated to an ON state and the high side switch 221-1 (e.g., control switch) is deactivated to an OFF state, the current in the respective inductor of phase #1 falls at the rate Vout/L.

Thus, $OFF\_t*Vout/L=(ON\_t-Dr\_tt)*(Vin-Vout)/L$;
and the on time of the synchronous switch, $OFF\_t=(ON\_t-Dr\_tt)*(Vin-Vout)/Vout$.

Some drivers (that could be used to drive the low side switch) may take a long time to switch off the low side switch. Due to this condition, the off time such as when the synchronous switch is activated is longer than intended. To alleviate affects of this condition, in one embodiment, the controller 210 can implement a programmable correction factor (Off_time_adj) that is subtracted from OFF_t. The calculated OFF time for the synchronous switch can be adjusted as follows:

$OFF\_t\_final=[(ON\_t-Dr\_tt)*(Vin-Vout)/Vout]-Off\_time\_adj$

In general, in accordance with embodiments as discussed herein, estimating or calculating the time duration in which to activate the high side switch 221-1 such as between time T25 and T26 can include adjusting the time duration in which to activate high side switch 221-1 to activate the low side switch 222-2 based at least in part on an amount of time required to deactivate the low side switch 222-2. Accordingly, the controller 140 can initiate activation of the high side switch 221-1 for a first time duration such as ON_t between time T25 and T26. The controller 210 calculates a second time duration such as OFF_t (e.g., time between T26 and T27) based at least in part on the input voltage and output voltage. The controller 210 then initiates activation of the low side switch 221-2 for the second time duration, OFF_t. Activation of the low side switch 221-2 couples the respective inductor to a reference voltage (e.g., ground) to reduce an amount of current though the inductor. Eventually the current through the inductor is substantially zero at which time the low side switch is also turned to an OFF state. During this time, charged capacitors 292 (in FIG. 2) on the output of the inductor produce enough current to power the load 215.

Thus, as shown, when in the discontinuous mode, the controller 210 activates the high side switch 221-1 of phase #1 between time T25 and time T26 (e.g., for a time duration of ON_t) to increase an amount of current through the inductor of phase #1.

Via PWM1, the controller 210 activates the low side switch 221-2 of phase #1 between time T26 and time T27 (e.g., for a time duration OFF_t) while the high side switch is turned OFF.

Subsequent to time T27, in accordance with the PWM1 signal set to an H state, the master driver circuit 202-1 maintains both the high side switch 221-1 and the low side switch 221-2 OFF between times T27 and T28. As shown, the output voltage (e.g., Vout applied to load 215) increases in magnitude between time T25 and T27. The magnitude of the output voltage applied produced by phase #1 decreases between time T27 and T28.

While in a tri-state mode such as between T27 and T28, between T30 and T31, etc., the inductor of phase #1 no longer supplies power to the load 118. Instead, during a tri-state mode, as mentioned, capacitor bank 292 coupled to the inductor supplies the power to the load 118.

In one embodiment, while in the discontinuous mode, the ripple voltage of the output voltage is a measure from the minimum voltage to the maximum voltage for a switching cycle (e.g., between time T25 and T28, between time T28 and time T31, etc.).

Note that following time T27, the controller 210 monitors a magnitude of the output voltage produced by phase #1 and compares it to a threshold value. In this example, at time T28, the controller 210 detects that the output voltage (i.e., Vout) drops below or is near a minimum acceptable threshold value. In response to detecting such a condition, the controller 210 initiates turning on the high side switch 221-1 again between time T28 and time T29. This has the affect of starting a new cycle in the discontinuous mode in which the controller 210 activates the high side switch 221-1 for a predetermined time followed by activation of the low side switch 221-2 for a calculated amount time (in a similar manner as previously discussed). The master driver circuit 202-1 subsequently prevents activation of both the high side switch 221-1 and low side switch 221-2 during a tri-state time duration (between time T27 and T28) in which the current supplied to the load 215 is so low that the energy in the capacitor bank and respective inductor of phase #1 is sufficient to power the load 215.

Thus, according to embodiments herein, during the discontinuous mode, the controller 210 repeats the steps of: activating the high side switch 221-1 for a predetermined time; activating the low side switch 221-2 for an estimated time such that the current through the inductor becomes substantially zero; and deactivating both the high side switch 221-1 and the low side switch 221-2 again during a tri-state mode until the output voltage (Vout) falls below a minimum threshold value. Operating in the discontinuous mode (during low power consumption by the load 215) is efficient and thus reduces energy consumption caused by unneeded switching operations in which energy is dissipated as heat in the controller circuit rather than power to the load 215.

As shown, the durations of setting the PWM1 signal amongst the different states (H, M, and L) can vary over time depending on current consumption by the load. For example, as the load consumes less current, the duration of the setting the PWM1 signal to the tri-state mode (e.g., H) can be longer as it takes longer for the output voltage Vout to fall below a threshold value. Conversely, as the load consumes more current, the duration of setting the PWM1 signal to the tri-state mode (e.g., H) can be decreased as the output voltage would falls below the threshold value much quicker.

In certain cases, the load 215 may eventually consume more current than phase #1 is able to supply while in the discontinuous mode. In such an instance, the controller 210 would initiate switching back to the continuous mode as previously discussed with respect to operation at time T7 in the timing diagram of FIG. 13.

Thus, in accordance with one embodiment, the master driver circuit 202-1 can operate the first power converter phase in a discontinuous mode to provide power to the load while disabling other phases of the multiple power converter phases from providing power to the load. That is, during a time such as between time T25 and T26, the master driver circuit 202-1 activates high side switch circuitry in the power converter phase #1 for a predetermined time as indicated by the pulse width modulation signal PWM1 to increase current through a respective inductor in the power converter phase #1 to power load 215 with a corresponding output voltage, Vout, produced by the inductor.

During a time such as between time T26 and T27, while the high side switch circuitry is deactivated, the master driver circuit 202-1 activates low side switch circuitry in the first power converter phase for an estimated amount of time at which the current through the inductor is substantially zero. During a time such as between time T27 and T28, in accordance with the pulse width modulation signal, the master driver circuit 202-1 maintains the high side switch circuitry and low side switch circuitry of power converter phase #1 in a deactivated state until a magnitude of the output voltage, Vout, produced by the inductor of power converter phase #1 crosses (e.g., falls below) a threshold value (e.g., a lowest acceptable voltage magnitude). In accordance with changing states of the PWM1 signal, the master driver circuit 202-1 repeats the above steps while in the discontinuous mode.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:
1. A method comprising:
in a first circuit device:
  receiving mode setting information inputted to the first circuit device to configure the first circuit device as a master;
  utilizing the mode setting information inputted to the first circuit device to identify a resource selected amongst multiple possible resources from which to receive at least one phase signal;
  configuring the first circuit device to receive the at least one phase signal from the identified resource selected amongst the multiple possible resources; and
  utilizing the at least one phase signal to control switching of a first set of at least power converter phases in a power supply.

2. The method as in claim 1 further comprising:
matching delays associated with the first phase signal, second phase signal, third phase signal, and the fourth phase signal to space the phases by substantially 90 degrees.

3. The method as in claim 1, wherein receiving mode setting information includes:
receiving mode setting information indicating to configure the first circuit device to receive the at least one phase signal locally from a phase signal generator in the first circuit device.

4. The method as in claim 3 further comprising:
in accordance with the received mode setting information in the first circuit device:

utilizing the first phase signal to control a first power converter phase in the power supply;

utilizing the second phase signal to control a second power converter phase in the power supply; and receiving a third phase signal and a fourth phase signal generated by the phase signal generator, the third phase signal and the fourth phase signal having a same frequency but offset in phase with respect to each other;

outputting the third phase signal and the fourth phase signal over a link to the second circuit device.

5. The method as in claim 4 further comprising:
in the second circuit device:
receiving the third phase signal and the fourth phase signal;
utilizing the third phase signal to control a third power converter phase in the power supply; and
utilizing the fourth phase signal to control a fourth power converter phase in the power supply.

6. The method as in claim 5 further comprising:
in the first circuit device:
receiving a pulse width modulation signal;
via the phase signal generator, utilizing the pulse width modulation signal to generate the first phase signal, the second phase signal, the third phase signal, and the fourth phase signal, wherein each of the first phase signal, second phase signal, third phase signal, and the fourth phase signal are out of phase with each other by a multiple of substantially 90 degrees.

7. The method as in claim 1, wherein receiving mode setting information includes receiving mode setting information indicating to:
configure the first circuit device to receive the at least one phase signal from a set of multiple phase signals generated by a phase generator in the first circuit device; and
configure the first circuit device to output at least one phase signal of the multiple phase signals generated by the phase signal generator from the first circuit device to a second circuit device.

8. The method as in claim 7 further comprising:
in the second circuit device:
receiving mode setting information inputted to the second circuit device to configure the second circuit device as a slave;
utilizing the mode setting information inputted to the second circuit device to configure the second circuit device to receive, on at least one bi-directional pin of the second circuit device, the at least one phase control signal outputted from the first circuit device; and
utilizing the at least one phase control signal outputted by the first circuit device to control a second set of phases in the power supply.

9. The method as in claim 8, wherein receiving the mode setting information inputted to the first circuit device includes detecting a state of a mode pin of the first circuit device, the state of the mode pin of the first circuit device indicating that the first circuit device is configured to be the master; and
wherein receiving the mode setting information inputted to the second circuit device includes detecting a state of a mode pin of the second circuit device, the state of the mode pin of the second circuit device indicating that the second circuit device is configured to be the slave.

10. The method as in claim 8 further comprising:
based on the mode setting information inputted to the first circuit device, configuring respective bi-directional pins of the first circuit device to output at least one phase signal of the multiple phase signals generated by the phase signal generator; and based on the mode setting information inputted to the second circuit device, configuring respective bi-directional pins of the second circuit device to receive the at least one phase signal outputted by the first circuit device.

11. A power supply circuit comprising:
a first driver circuit, the first driver circuit comprising:
a first input to receive a pulse width modulation signal;
a phase generator circuit to derive multiple phase control signals from the pulse width modulation signal;
a switch driver circuit configured to utilize a first phase control signal of the multiple phase control signals to control a first power converter phase in the power supply; and
an output configured to output a second phase control signal of the multiple phase control signals to a second driver circuit.

12. The power supply circuit as in claim 11, wherein the second driver circuit further comprises:
an input configured to receive the second phase control signal generated by the first driver circuit;
a switch driver circuit configured to utilize the second phase control signal to control a second power converter phase in the power supply.

13. The power supply circuit as in claim 12, wherein the first driver circuit further comprises:
an input configured to receive first mode setting information, the first mode setting information indicating that the first driver circuit is configured as a master driver circuit;
wherein the second driver circuit further comprises:
an input on which to receive second mode setting information, the second mode setting information indicating that the second driver circuit is configured as a slave driver circuit.

14. The power supply circuit as in claim 13, wherein the first driver circuit is configured with the first mode setting information to output the second phase control signal to the second driver circuit; and
wherein the second driver circuit is configured with the second mode setting information to receive the second phase control signal generated by the first driver circuit.

15. A power supply circuit comprising:
a first chip circuit, the first chip circuit comprising:
an input to receive mode setting information to configure the first chip circuit as a master, the first chip circuit configured to utilize the mode setting information inputted to the first chip circuit to identify a resource selected amongst multiple possible resources from which to receive at least one phase signal;
a circuit configured to receive the at least one phase signal from the identified resource selected amongst the multiple possible resources; and
a switch driver circuit configured to control switching of a first set of power converter phases in the power supply circuit based on the at least one phase signal.

16. The power supply circuit as in claim 15, wherein the mode setting information indicates to:
configure the first chip circuit to receive the at least one phase signal from a set of multiple phase signals generated by a phase generator in the first chip circuit; and
configure the first chip circuit to output at least one phase signal of the multiple phase signals generated by the phase generator circuit from the first chip circuit to a second chip circuit.

17. The power supply circuit as in claim 16, wherein the second chip circuit comprises:
- an input to receive mode setting information to configure the second chip circuit as a slave;
- a bi-directional interface circuit configured to utilize the mode setting information inputted to the second chip circuit to configure at least one bi-directional pin of the bi-directional interface circuit to receive the at least one phase control signal outputted from the first chip circuit; and
- a switch driver circuit configured to utilize the at least one phase control signal outputted by the first chip circuit to control a second set of phases in the power supply circuit.

18. The power supply circuit as in claim 17, wherein the first chip circuit is configured to detect a state of a mode pin of the first chip circuit, the state of the mode pin of the first chip circuit indicating that the first circuit device is configured to be the master; and
- wherein the second chip circuit is configured to detect a state of a mode pin of the second chip circuit, the state of the mode pin of the second chip circuit indicating that the second chip circuit is configured to be the slave.

19. The power supply circuit as in claim 17, wherein a bi-directional interface circuit in the first chip circuit configures, based on the mode setting information inputted to the first chip circuit, respective bi-directional pins of the first chip circuit to output at least one phase signal of the multiple phase signals generated by the phase signal generator; and
- wherein a bi-directional interface circuit in the second chip circuit configures, based on the mode setting information inputted to the second chip circuit, respective bi-directional pins of the second chip circuit to receive the at least one phase signal outputted by the first chip circuit.

20. The power supply circuit as in claim 15, wherein the mode setting information indicates to configure the first chip circuit to receive the at least one phase signal locally from a phase generator circuit in the first chip circuit.

21. A method comprising:
- in a first switch driver chip circuit:
  - receiving a pulse width modulation signal;
  - deriving multiple phase control signals from the pulse width modulation signal to control multiple power converter phases in a power supply;
  - utilizing a first phase control signal of the multiple phase control signals to control a first power converter phase in a power supply; and
  - outputting a second phase control signal of the multiple phase control signals to a second switch driver chip circuit.

22. The method as in claim 21 further comprising:
- in the second switch driver chip circuit:
  - receiving the second phase control signal generated by the first switch driver chip circuit;
  - utilizing the second phase control signal to control a second power converter phase in the power supply.

23. The method as in claim 22 further comprising:
- in the first switch driver chip circuit:
  - receiving first mode setting information, the first mode setting information indicating that the first switch driver chip circuit is configured as a master;
- in the second switch driver chip circuit:
  - receiving second mode setting information, the second mode setting information indicating that the second switch driver chip circuit is configured as a slave.

24. The method as in claim 23, wherein outputting of the second phase control signal to the second switch driver chip circuit occurs in response to detecting that the first switch driver chip circuit has been configured as the master; and
- wherein receiving the second phase control signal generated by the first switch driver chip circuit occurs in response to detecting that the second switch driver chip circuit has been configured as the slave.

25. The method as in claim 21 further comprising:
- in the first switch driver chip circuit:
  - detecting that the pulse width modulation signal has been set to a first state of at least three possible states, the first state corresponding to a tri-state mode;
  - in response to detecting that the pulse width modulation signal has been set to the first state, controlling a state of the first phase control signal to initiate turning OFF both high side switch circuitry and low side switch circuitry of the first power converter phase;
  - in response to detecting that the pulse width modulation signal has been set to the first state, controlling a state of the second phase control signal outputted to the second switch driver chip circuit to initiate turning OFF high side switch circuitry and low side switch circuitry of at least one phase controlled by the second switch driver circuit.

26. The method as in claim 21 further comprising:
- via the first phase control signal, operating the first power converter phase in a continuous mode, the continuous mode including switching between i) activation of high side switch circuitry in the first power converter phase when low side switch circuitry of the first power converter phase is deactivated and ii) activation of the low side switch circuitry when the high side switch circuitry is deactivated; and
- in response to detecting that the pulse width modulation signal is set to a disable mode after operating in the continuous mode, initiating simultaneous deactivation of the high side switch and low side switch in the first power converter phase to deactivate the first power converter phase.

27. The method as in claim 26 further comprising:
- subsequent to the disable mode:
  - initiating reactivation of the high side switch circuitry in the first power converter phase in response to detecting that the pulse width modulation signal indicates to activate the high side switch circuitry in the first power converter phase; and
  - preventing activation of low side switch circuitry in at least one phase controlled by the second switch driver chip circuit until after respective high side switch circuitry in the at least one phase controlled by the second switch driver chip circuit has been activated.

28. The method as in claim 21 further comprising:
- initiating deactivation of high side switch circuitry and low side switch circuitry in the multiple power converter phases to deactivate the multiple power converter phases in response to detecting that the pulse width modulation signal is set to a phase disable mode;
- initiating reactivation of the multiple power converter phases in accordance with a predetermined reactivation order subsequent to detecting the phase disable mode.

29. The method as in claim 21 further comprising:
- initiating deactivation of high side switch circuitry and low side switch circuitry in each of the multiple power converter phases to deactivate the multiple power converter phases in response to detecting that the pulse width modulation signal is set to a phase disable mode;

during sequential reactivation of the multiple power converter phases over time, preventing activation of low side switch circuitry in a respective phase of the multiple power converter phases until after high side switch circuitry in the respective phase has been activated.

30. The method as in claim 21, wherein utilizing the first phase control signal of the multiple phase control signals to control the first power converter phase in the power supply includes:

operating the first power converter phase in a discontinuous mode to provide power to the load while disabling other phases of the multiple power converter phases from providing power to the load.

31. The method as in claim 30, wherein operating the first power converter phase in the discontinuous mode includes:

(a) activating high side switch circuitry in the first power converter phase for a predetermined time as indicated by the pulse width modulation signal to increase current through an inductor in the first power converter phase to power a load with a corresponding output voltage produced by the inductor;

(b) while the high side switch circuitry is deactivated, activating low side switch circuitry in the first power converter phase for an estimated amount of time at which the current through the inductor is substantially zero; and (c) in accordance with the pulse width modulation signal, maintaining the high side switch circuitry and low side switch circuitry in a deactivated state until a magnitude of the output voltage produced by the inductor crosses a threshold value; and upon detecting that the magnitude of the output voltage crosses the threshold value, repeating steps (a), (b), and (c) in accordance with states of the pulse width modulation signal.

* * * * *